(12) United States Patent
Marin

(10) Patent No.: US 6,334,246 B1
(45) Date of Patent: Jan. 1, 2002

(54) METHOD FOR FIXING AN ADDITIONAL BOTTOM TO THE EXTERNAL SURFACE OF THE BOTTOM OF A CONTAINER

(75) Inventor: Visino Marin, Casalbellotto (IT)

(73) Assignee: Attrezzeria M.V. di Marin Visino eC. S.n.c., Casalmaggiore (IT)

( * ) Notice: Subject to any disclaimer, the term of this patent is extended or adjusted under 35 U.S.C. 154(b) by 0 days.

(21) Appl. No.: 09/285,790

(22) Filed: Apr. 5, 1999

(30) Foreign Application Priority Data

| Apr. 9, 1998 | (IT) | ...................................... | MN98A0014 |
| May 29, 1998 | (IT) | ...................................... | MN98A0020 |
| Jun. 19, 1998 | (IT) | ...................................... | MN98A0024 |
| Jun. 19, 1998 | (IT) | ...................................... | MN98A0023 |
| Dec. 23, 1998 | (IT) | ...................................... | MN98A0049 |
| Jan. 13, 1999 | (IT) | ...................................... | MN99A0001 |
| Mar. 22, 1999 | (IT) | ...................................... | MN99A0016 |

(51) Int. Cl.⁷ ........................... B21D 39/00; A47J 27/00
(52) U.S. Cl. ..................... 29/509; 29/509; 126/390.1
(58) Field of Search ..................... 29/509, 505, 516, 29/521, 523, 511; 126/390, 390.1; 220/620, 623, 626, 636; 72/348, 361, 351; 99/422, 447; D7/354

(56) References Cited

U.S. PATENT DOCUMENTS

| 1,590,749 | A | * | 6/1926 | Hulbert ........................ 29/505 |
| 2,239,368 | A | * | 4/1941 | Lyon ........................... 29/505 |
| 2,605,928 | A | * | 8/1952 | Heller ......................... 126/390 |
| 4,282,649 | A | * | 8/1981 | Wilson ......................... 29/509 |
| 4,544,818 | A | * | 10/1985 | Minamida .................... 126/390 |
| 5,345,667 | A | | 9/1994 | Coppier |
| 5,396,834 | A | * | 3/1995 | Gambini ...................... 126/390 |
| 5,430,928 | A | * | 7/1995 | Flammang .................... 29/505 |
| 5,564,590 | A | * | 10/1996 | Kim ........................... 126/390 |
| 5,647,271 | A | | 7/1997 | Jean-Claude et al. |
| 5,809,630 | A | * | 9/1998 | Coissard ...................... 29/505 |
| 5,903,967 | A | * | 5/1999 | Taniguchi .................... 29/505 |

FOREIGN PATENT DOCUMENTS

| CH | 227 769 | 7/1943 |
| DE | 91 11 901 | 11/1991 |
| DE | 44 29 912 | 10/1995 |
| EP | 0 509 860 | 10/1992 |
| EP | 0 518 804 | 12/1992 |
| EP | 0 668 040 | 8/1995 |
| FR | 644 290 | 10/1928 |
| GB | 894 074 | 4/1962 |
| GB | 1 515 951 | 6/1978 |

* cited by examiner

Primary Examiner—S. Thomas Hughes
Assistant Examiner—Marc Jimenez
(74) Attorney, Agent, or Firm—Guido Modiano; Albert Josif; Daniel O'Byrne

(57) ABSTRACT

A method for fixing an additional bottom to the external surface of the bottom of a container, wherein the additional bottom and the container are mutually fixed by coining in a die with a male part and a female part which are connected to the footing and the moving slider of a press.

20 Claims, 28 Drawing Sheets

FIG. 3
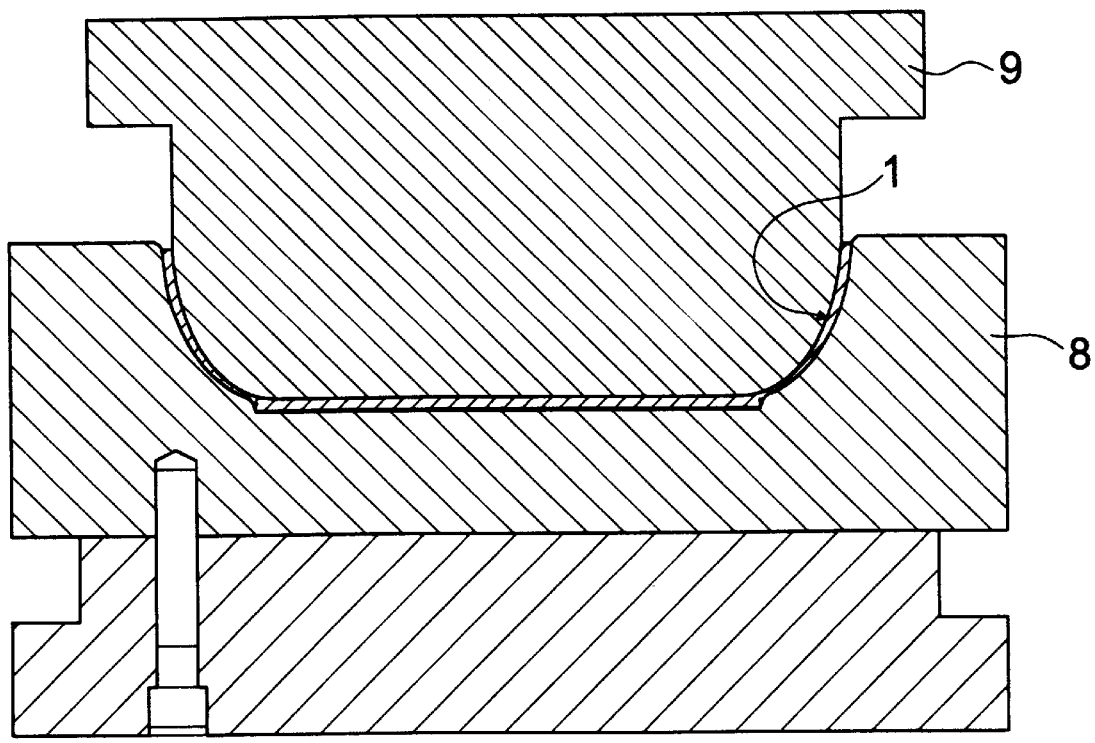
FIG. 4
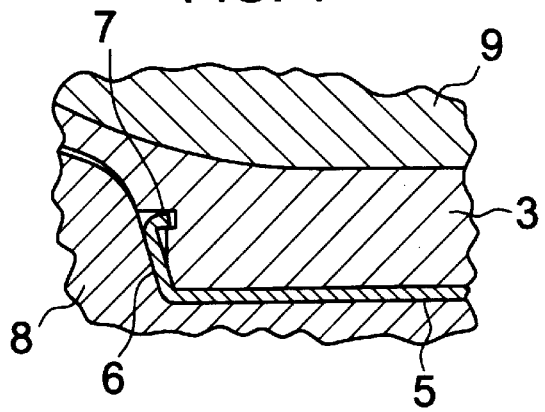
FIG. 17
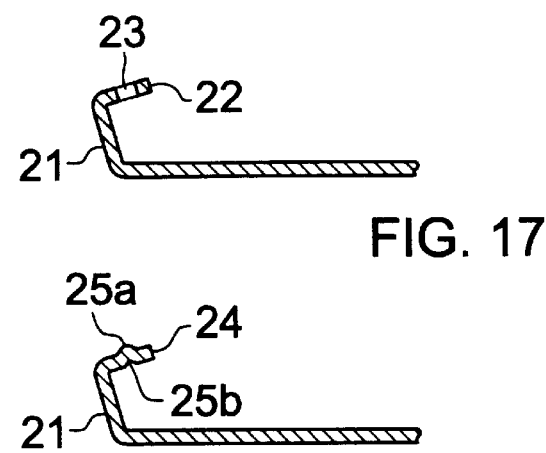
FIG. 18

FIG. 5
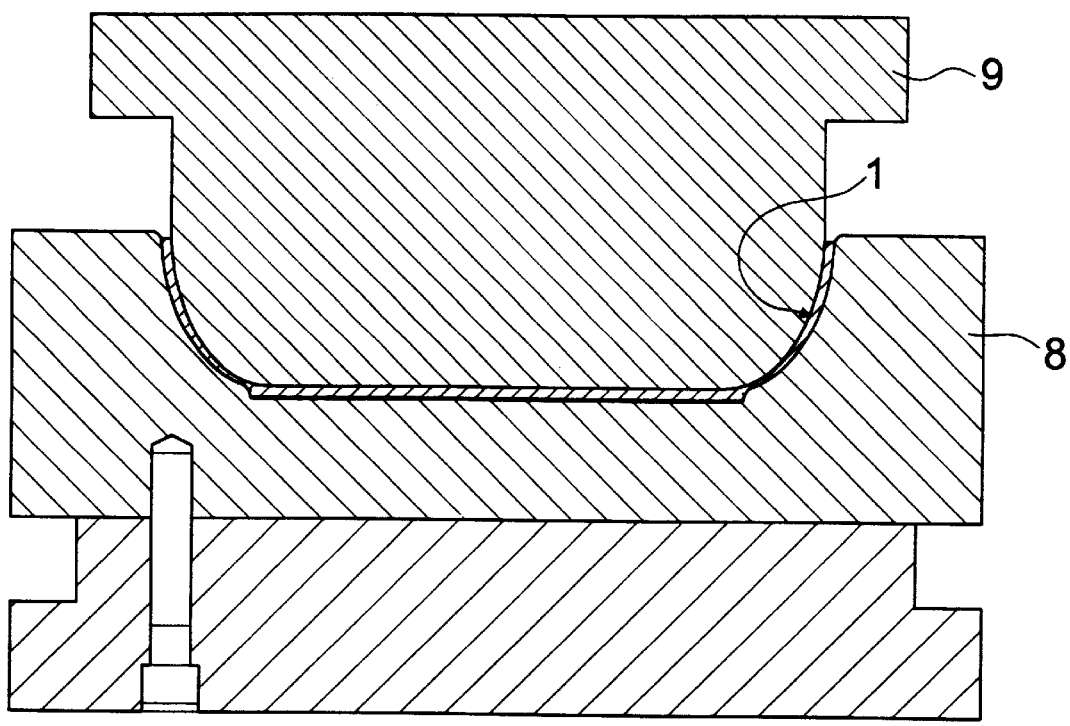
FIG. 6
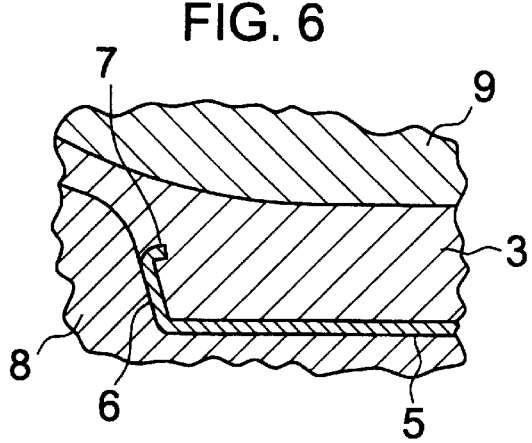
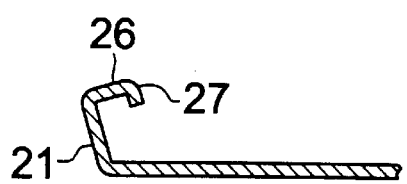
FIG. 19
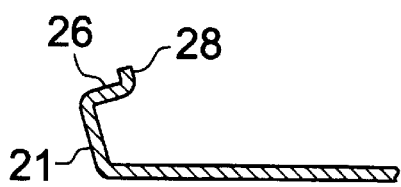
FIG. 20

METHOD FOR FIXING AN ADDITIONAL BOTTOM TO THE EXTERNAL SURFACE OF THE BOTTOM OF A CONTAINER

BACKGROUND OF THE INVENTION

The present invention relates to a method for fixing an additional bottom to the external surface of the bottom of a container.

It is known that aluminum containers for household use, such as pots and pans, which are meant to be placed in contact with a heat source in order to cook food, have some drawbacks, such as for example the fact that it is not possible to determine the automatic power-on of induction plates, which are becoming increasingly popular as heat sources included in household kitchen cooking ranges and are activated, as widely known, by contact with steel elements.

The prior art has accordingly suggested to add an additional bottom made of steel to aluminum containers, but the coupling methods of said bottom have been found to be susceptible of improvement, also in the case of containers made of materials other than aluminum which are coupled to additional bottoms made of materials other than steel.

SUMMARY OF THE INVENTION

Accordingly, the aim of the present invention is to provide a method for fixing an additional bottom to the external surface of the bottom of a container which is very simple and effective.

This aim is achieved by a method for fixing an additional bottom to the external surface of the bottom of a container, according to the invention, characterized in that the mutual fixing of said additional bottom and of said container is achieved by coining in a die with a male part and a female part which are connected to the footing and to the moving slider of a press.

BRIEF DESCRIPTION OF THE DRAWINGS

Further characteristics and advantages will become apparent from the description of some preferred but not exclusive embodiments of the invention, illustrated only by way of non-limitative example in the accompanying drawings, wherein:

FIGS. 3, 5 and 7, together with the respective detail views of FIGS. 4 6 and 8, illustrate three successive steps of the method according to the first embodiment;

FIGS. 17 to 20 are views of variations of the shape of the tooth at the end of the rim;

DESCRIPTION OF THE PREFERRED EMBODIMENTS

Figure 1:
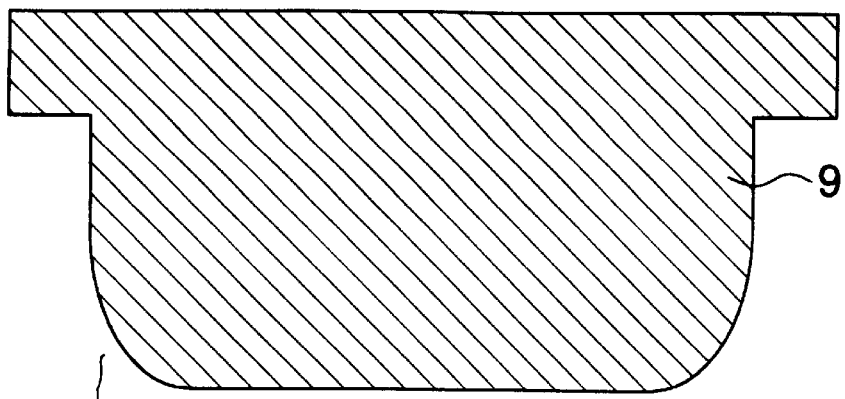
FIG. 1, together with the respective detail view of FIG. 2, illustrates the elements for performing the method according to a first embodiment.

With reference to the above FIGS. 1 to 8, the reference numeral 1 designates an aluminum container shaped like a solid of revolution which is provided with the circumferential seat 2 arranged proximate to the bottom 3, and the reference numeral 4 generally designates an additional bottom made of steel which has the shape of a flat plate 5 with a raised rim 6 which ends with a tooth 7 directed toward the inside of said bottom.

Figure 2:
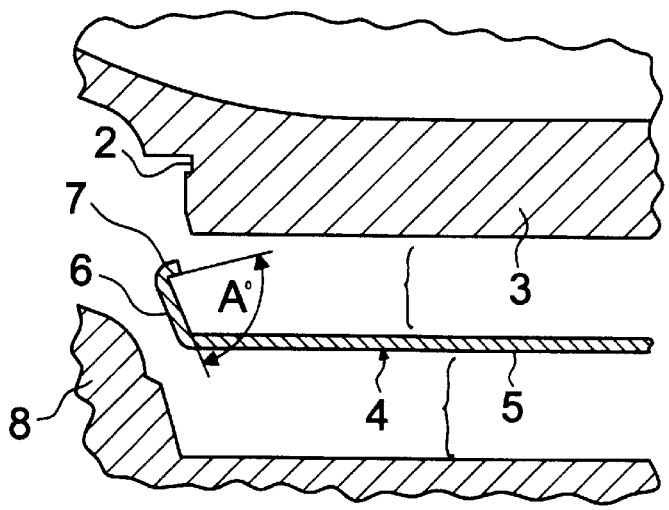

The tooth 7 is shaped so as to have a straight portion with a continuous surface which forms, together with the rim 6, an angle, designated by A in FIG. 2, which measures no more than approximately 90° and no less than approximately 60°, and has a length which prevents it from interfering in the mutual approach of the bottom 4 and the container 1.

The additional bottom 4 and the container 1 are mutually fixed according to the steps described hereafter, by means of a cold coining die which comprises a monolithic female part 8 which is fixed to the footing of a press and a male part 9 which is fixed to the movable slider of said press; said die of course also comprises conventional additional elements, such as for example an extractor.

FIGS. 3 and 4 illustrate the condition in which the method begins, with the additional bottom 4 accommodated in the female part 8 and with the container 1 superimposed thereon, and FIG. 4 clearly points out that the raised rim 6 rests on the side wall of said female part: the male part 9 has descended into contact with said container but no deformation has occurred as yet.

The coining step starts from the described situation, causing the material of the container to undergo deformation, as shown in FIG. 6, so as to lock the tooth 7 inside it.

Figure 7:
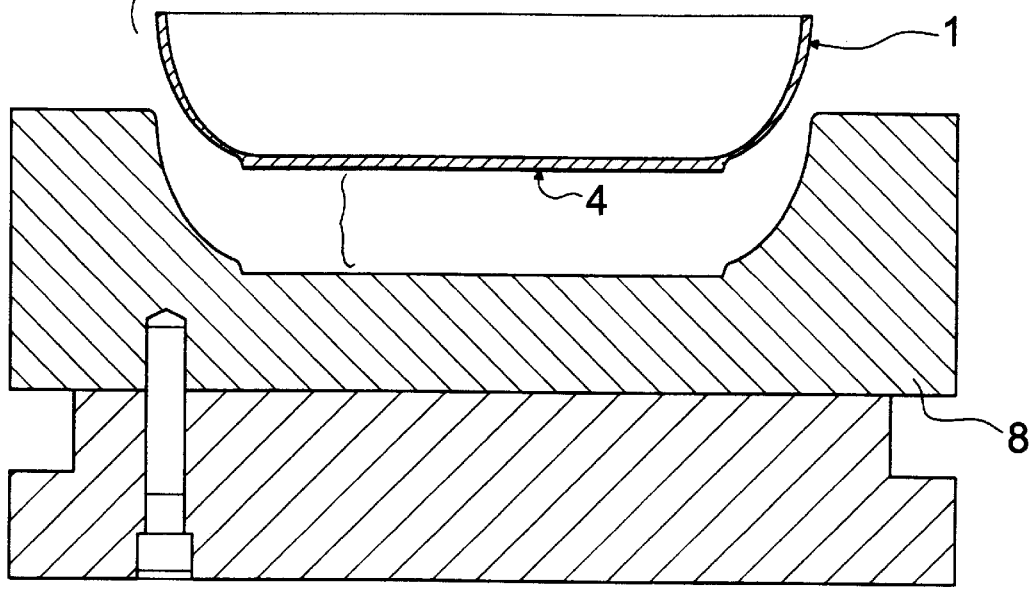
Figure 8:
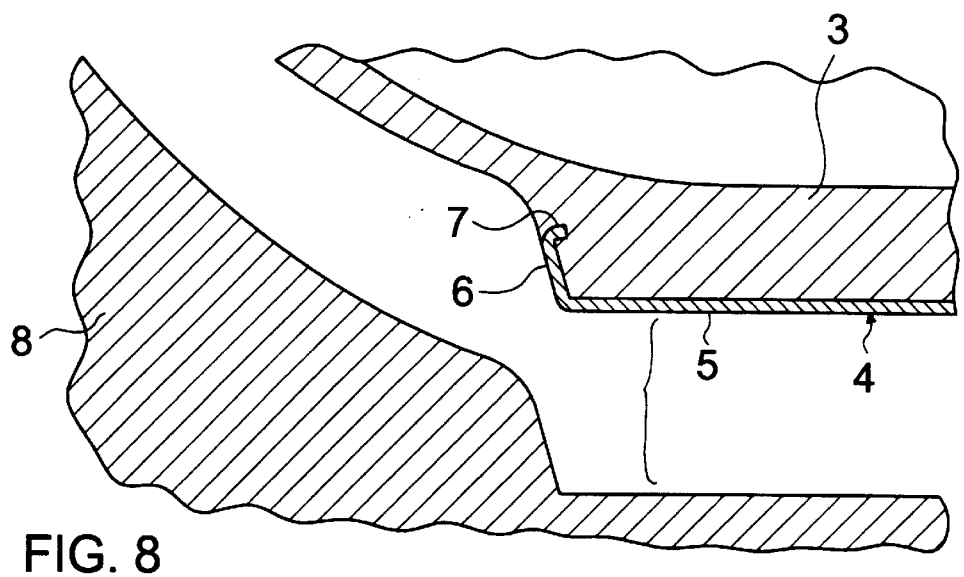
Figure 9:
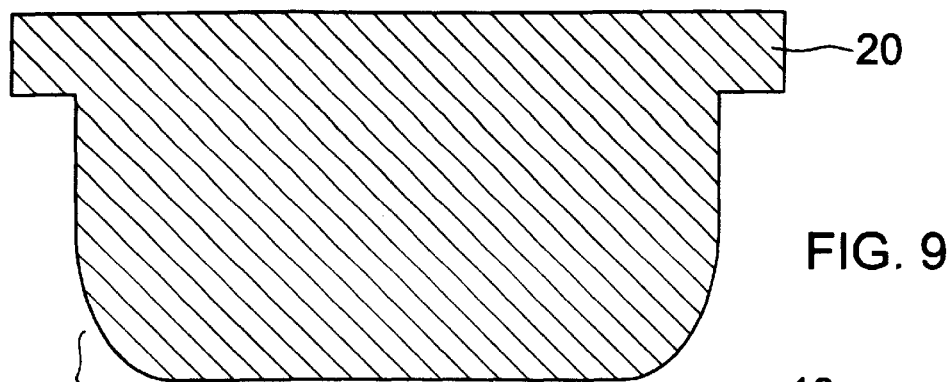
FIG. 9, together with the respective detail view of FIG. 10, illustrates the elements for performing the method according to a first different embodiment.
Figure 10:
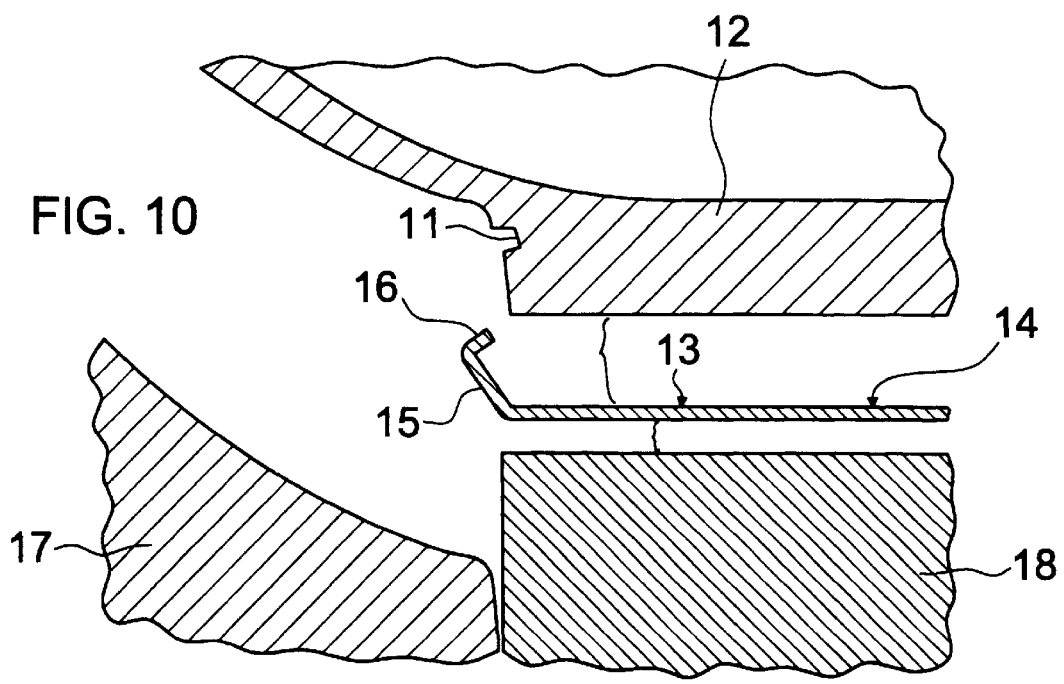

The result is thus obtained, as shown in FIGS. 7 and 8 with the die open, of making the additional steel bottom 4 adhere to the external surface of the bottom 3 of the aluminum container 1, which is locked with respect to it by virtue of the embedding of the tooth 7 in the material of said container.

A different embodiment of the method is now described with reference to FIGS. 9 to 16.

With reference to such figures, the reference numeral 10 generally designates an aluminum container provided with the circumferential seat 11 located proximate to the bottom 12, and the reference numeral 13 generally designates the additional bottom made of steel, which is shaped like a flat plate 14 with a raised rim 15 ending with a tooth 16 which is directed inward.

The angle between the rim 15 and the tooth 16, which is again shaped so as to have a straight portion with a continuous surface, can assume the same values mentioned above with reference to the additional bottom 4, and said tooth is again such as to not interfere with the mutual approach of the bottom 13 and the container 10.

The additional bottom 13 is fixed to the container 10 by means of the die, which comprises the female part 17, with a baseplate 18 supported by elastic means, such as a spring 19, which is fixed to the footing of a press, and a male part 20, which is fixed to the movable slider of said press.

Figure 11:
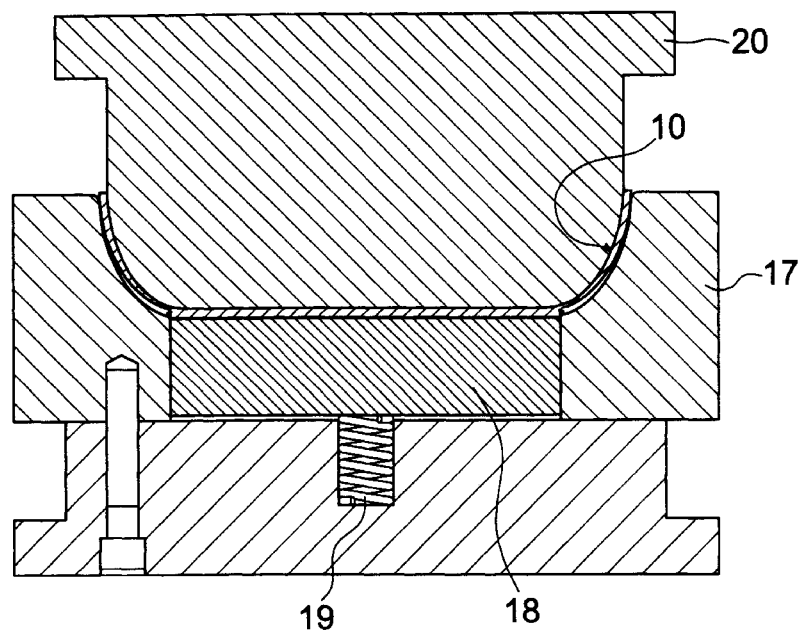
FIGS. 11, 13, and 15, together with the respective detail views of FIGS. 12, 14 and 16, illustrate three successive steps of the method according to the first different embodiment.
Figure 12:
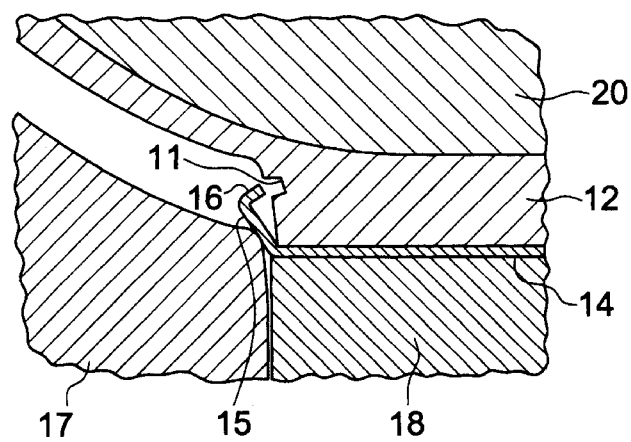
Figure 13:
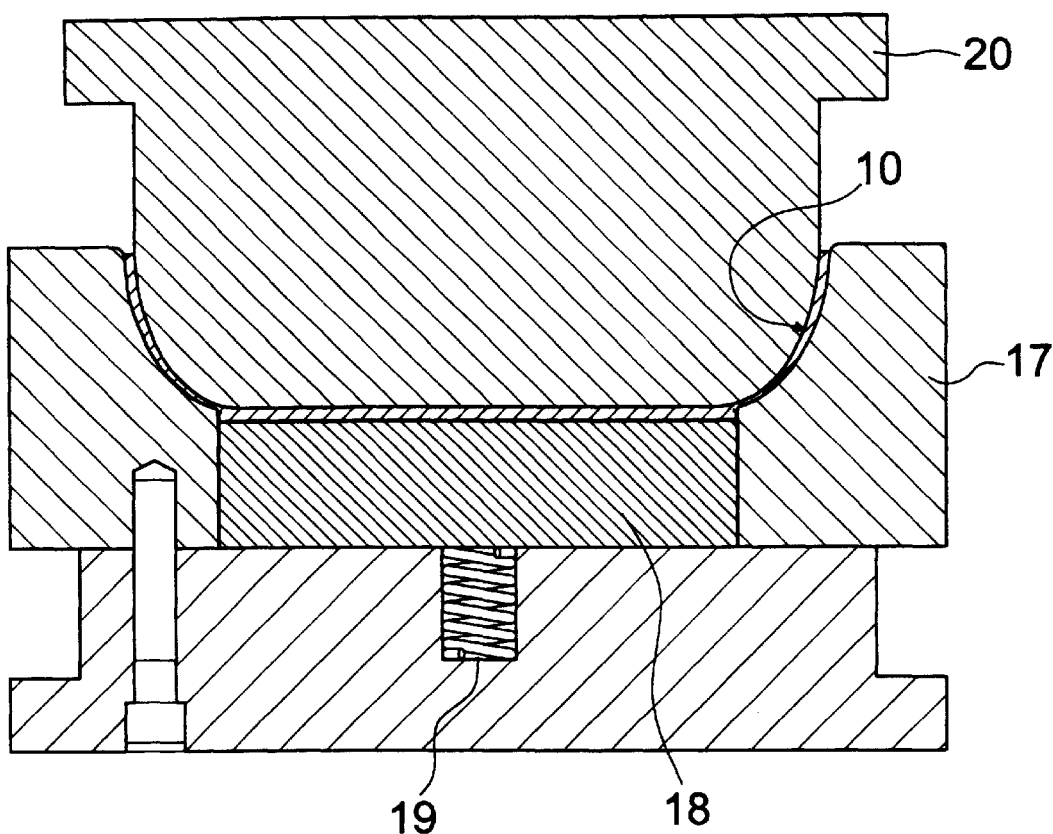

FIGS. 11 and 12 illustrate the situation just after the beginning of the method: the additional bottom 13, with the overlying container 10, rests on the baseplate 18, and the male part 20 has descended, moving first into contact with said container and then moving the baseplate 18 downward to the position shown in said FIGS. 11 and 12, so that the raised rim 15 makes initial contact with the wall of the female part 17 at the peripheral region of the baseplate 18; at this point, no deformation has yet occurred.

Figure 14:
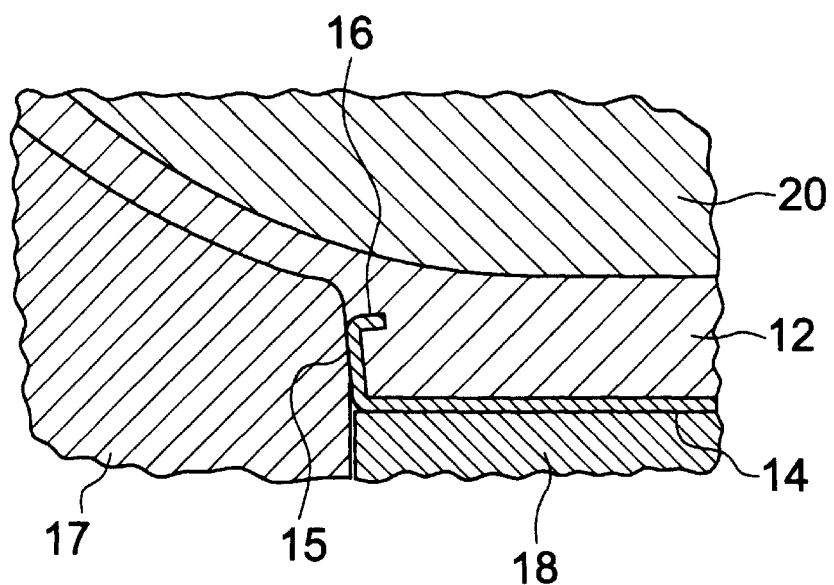
Figure 15:
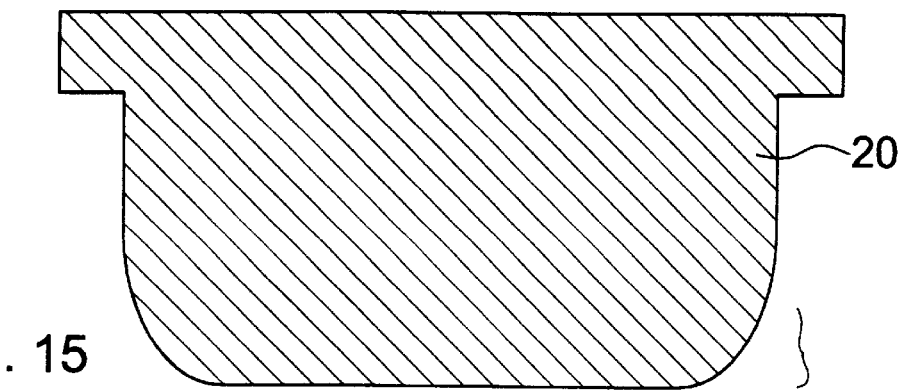
Figure 16:
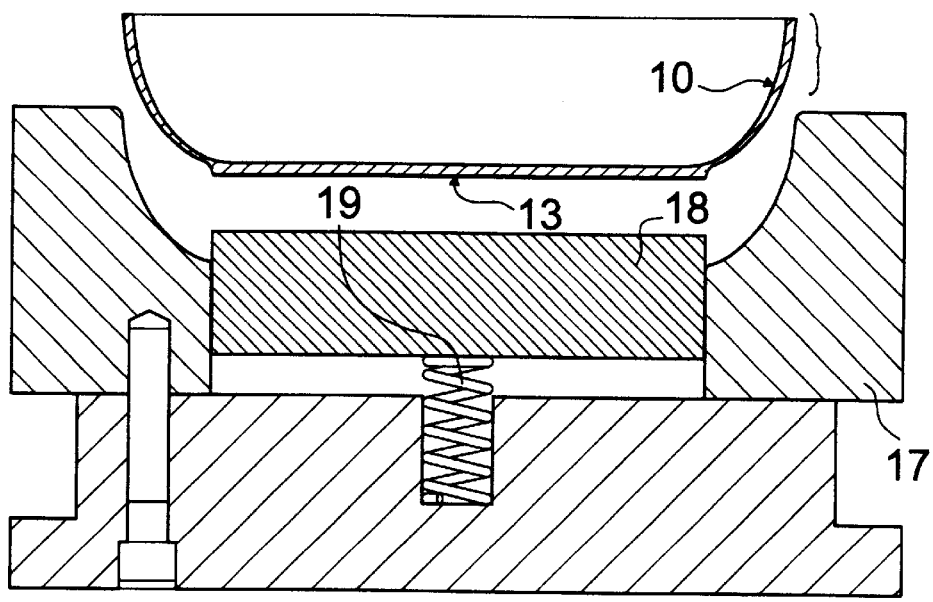
Figure 16:
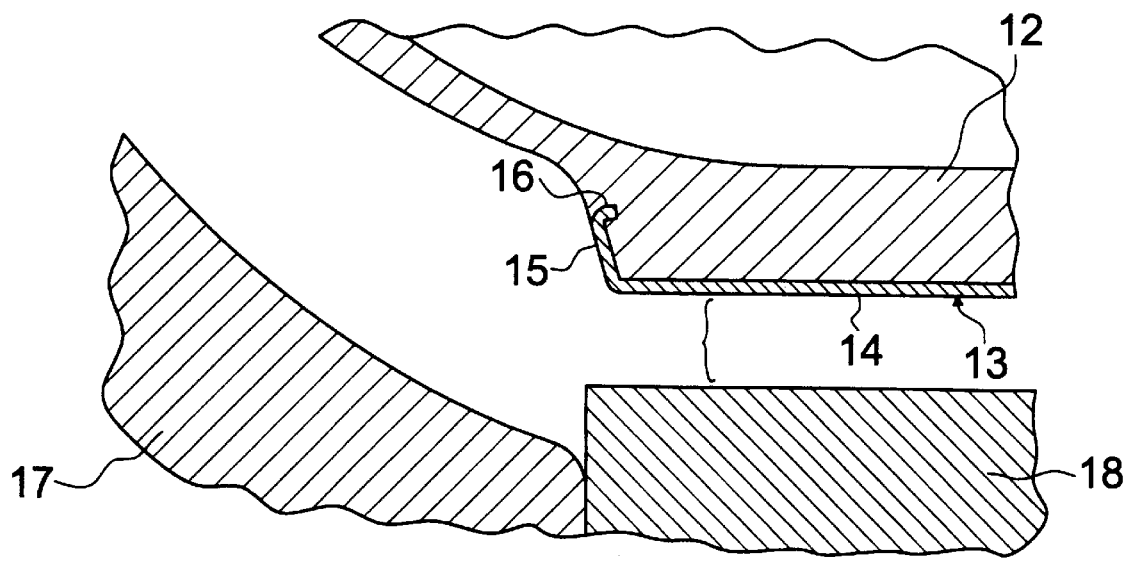
Figure 21:
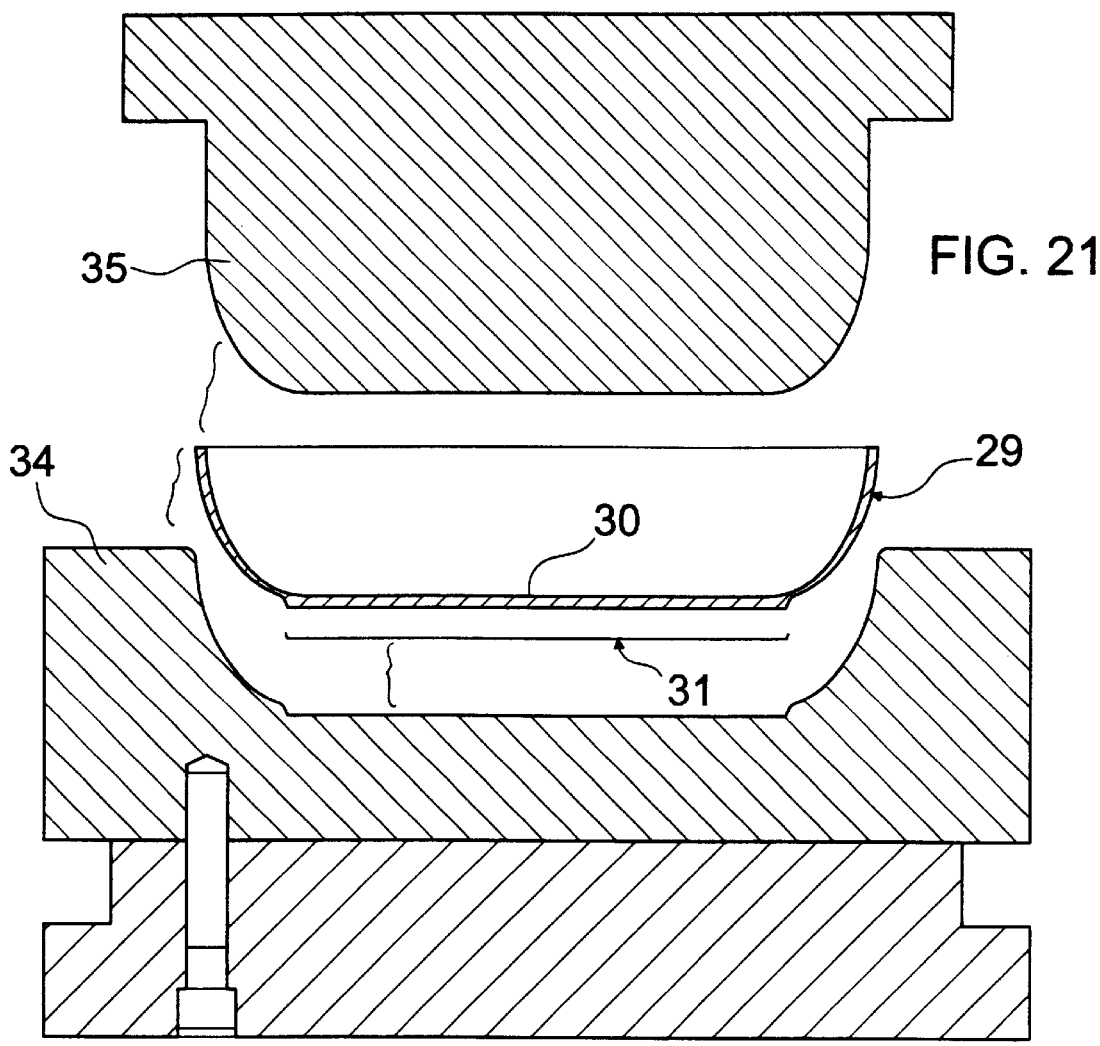
FIG. 21, together with the respective detail view of FIG. 22, illustrates the elements for performing the method according to another embodiment.
Figure 22:
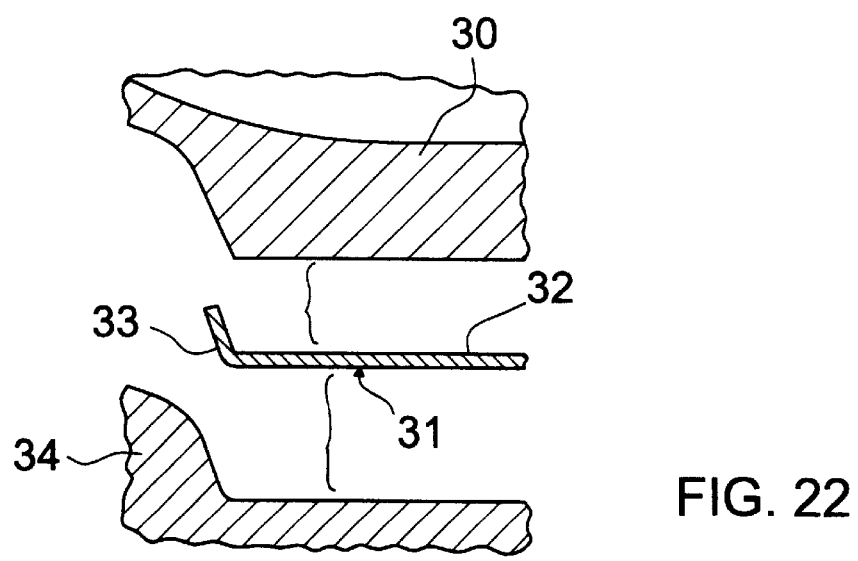

From the described situation there begins the step for folding the raised rim 15 until contact occurs with the container 10 and the tooth 16 enters the seat 11; subsequent coining determines the deformation of the material of said container 10, as shown in FIG. 14, so as to lock the additional bottom 13 against the bottom 12 of the container 10, as shown in FIGS. 15 and 16 with the die open.

The described embodiment is not changed fundamentally if the female part is connected to the movable slider of the press and the male part is connected to the footing of said press.

FIGS. 17 to 20 illustrate different embodiments of the tooth provided at the end of the raised rim of the additional bottom, designated by the reference numeral 21 in all of said figures.

In the embodiment of FIG. 17, the tooth has the shape of a straight portion 22 provided with holes such as 23 which are filled, during coining, by the material of the container.

In the embodiment of FIG. 18, the straight portion 24 formed by the tooth is provided with discontinuities, such as the protrusion 25a with a corresponding cavity 25b, which can be continuous or segmented.

Finally, the embodiments of FIGS. 19 and 20 illustrate teeth which, after a straight portion 26, have ends 27 and 28 which are folded in one direction or the other.

Further embodiments consist of the fact that, for example, it is possible to provide for the presence of strengthening ribs which connect the raised rim of the additional bottom to the substantially flat part thereof, and the seat formed in the container may also be omitted.

Another embodiment of the invention is described with reference to FIGS. 21 to 24: in said figures, the reference numeral 29 designates an aluminum container which is shaped like a solid of revolution provided with a bottom 30, and the reference numeral 31 generally designates an additional bottom made of steel which is shaped like a flat plate 32 with a raised rim 33: said raised rim 33 has, in cross-section, a substantially continuous straight shape which forms, together with the flat plate 32, an angle of more than 90° and is accordingly shaped so as to form a flared conical surface.

Figure 23:
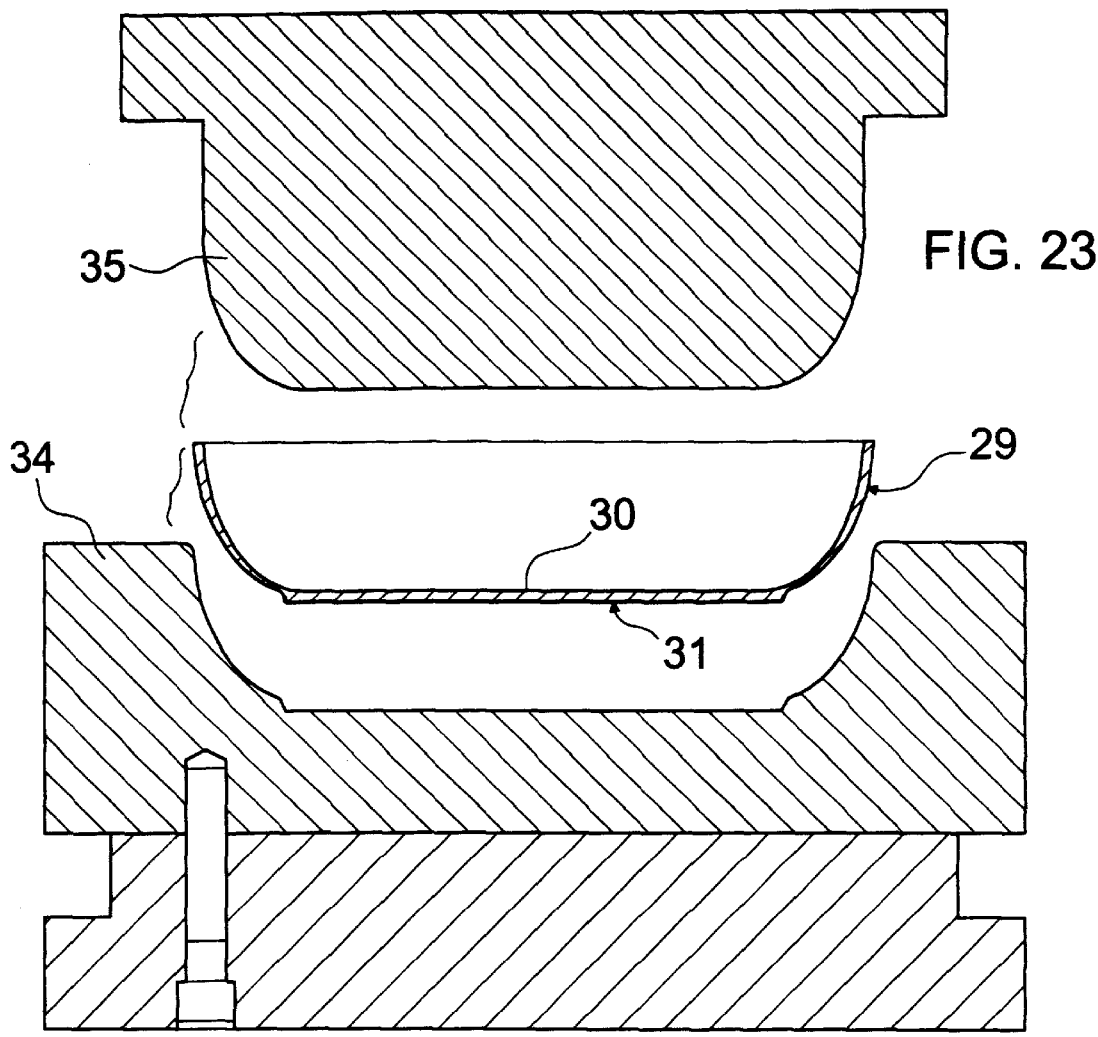
FIG. 23, together with the respective detail view of FIG. 24, illustrates the result achieved by the method.
Figure 24:
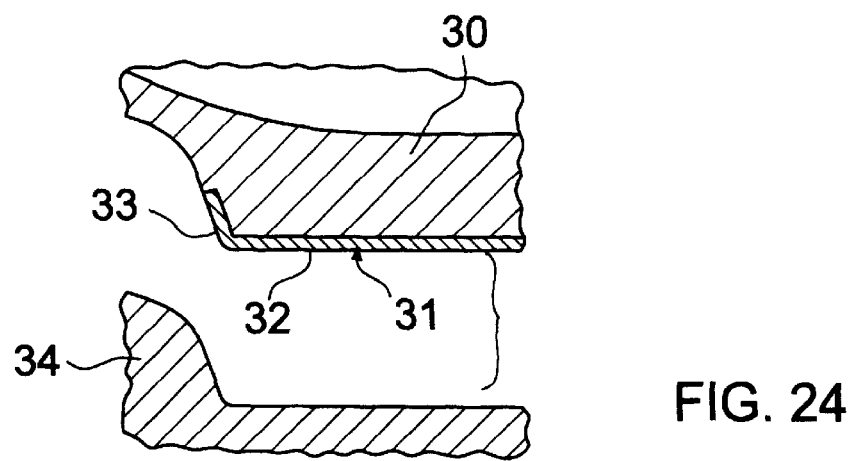

The additional bottom 31 and the container 29 are mutually fixed according to steps such as the ones described for the previously considered embodiments, by means of a cold coining die which comprises a monolithic female part 34, which is fixed to the footing of a press, and a male part 35, which is fixed to the moving slider of said press: the result, shown in FIGS. 23 and 24 with the die open, consists of the fact that the additional bottom 31 made of steel is blocked so as to adhere to the external surface of the bottom 30 of the container 29.

The same result might of course also be achieved by means of a die with a female part provided with a baseplate supported by elastic means and fixed to the footing of a press and a male part fixed to the movable slider of said press.

FIGS. 25 to 29 illustrate different embodiments of the raised rim located in the peripheral region of the flat plate 32 of the additional bottom meant to be fixed to the bottom 30 of an aluminum container.

Figure 25:
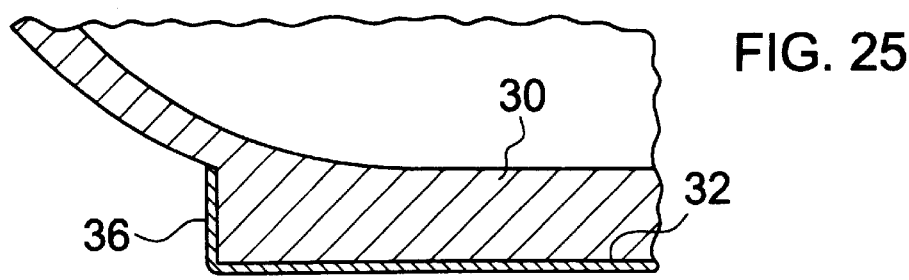
FIGS. 25 to 29 are views of variations of the raised rim.

In the embodiment of FIG. 25, the raised rim 36 has a substantially straight continuous cross-section which forms, together with the plate 32, an angle of substantially 90°, and is accordingly shaped so as to form a cylindrical surface.

Figure 26:
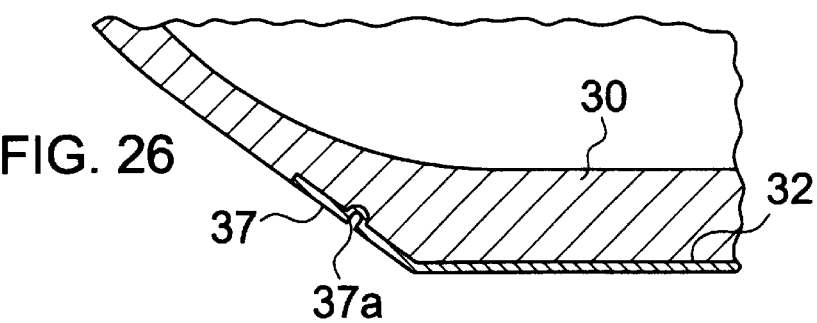
Figure 27:
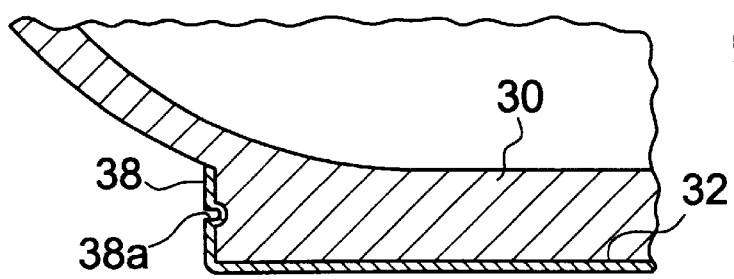

In the embodiments of FIGS. 26 and 27, the raised rims 37 and 38 respectively have circumferential protrusions 37a, 38a which are directed toward the inside of the container.

Figure 28:
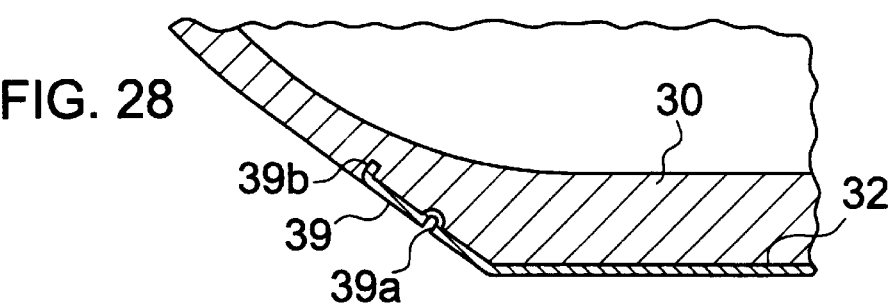
Figure 29:
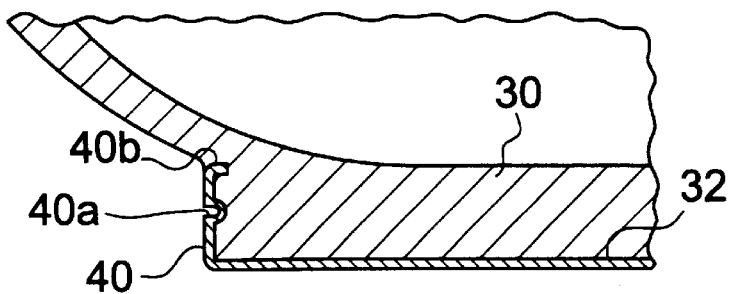
Figure 30:
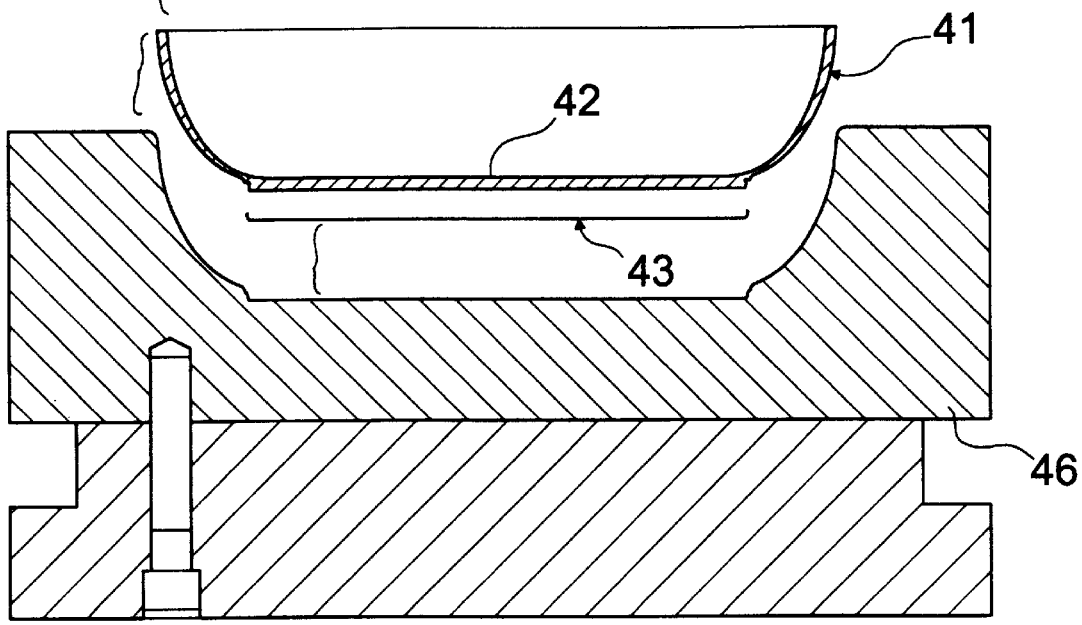
FIG. 30, together with the respective detail view of FIG. 31, illustrates the elements for performing the method according to another embodiment.
Figure 31:
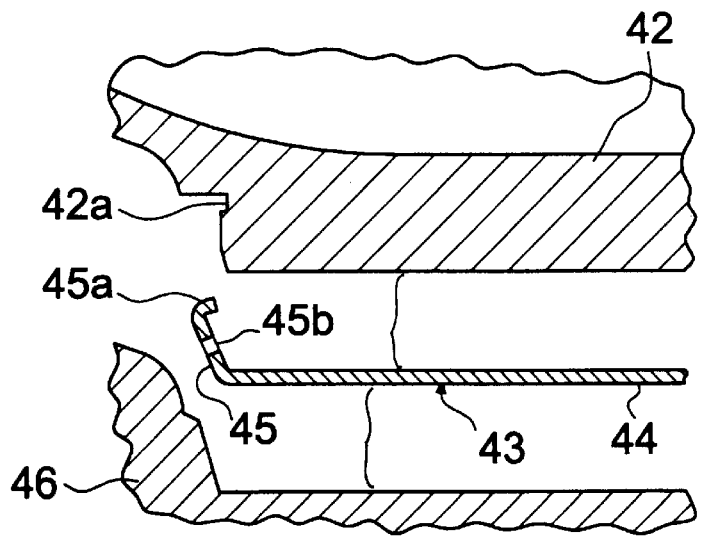

In the embodiments of FIGS. 28 and 29, the raised rims 39 and 40 respectively have circumferential protrusions 39a and 40a and end teeth 39b and 40b.

Other different embodiments are possible; thus, for example, the raised rim of the additional bottom can have a curved cross-section and can include more than one circumferential protrusion, or can be provided with a plurality of projections; said circumferential protrusion and said projections can equally be directed toward the inside or the outside of the container and can have any shape.

Another embodiment of the invention is described with reference to FIGS. 30 to 33: in these figures, the reference numeral 41 designates an aluminum container which is shaped like a solid of revolution and is provided with a bottom 42, and the reference numeral 43 generally designates an additional bottom made of steel, which is shaped like a flat plate 44 with a raised rim 45; said raised rim 45 has a substantially straight cross-section which forms an angle of more than 90° with the flat plate 44 and is provided with an end tooth 45a, which is suitable to fit in the circumferential seat 42a provided proximate to the bottom 42 of the container, and with a plurality of holes such as 45b.

Figure 32:
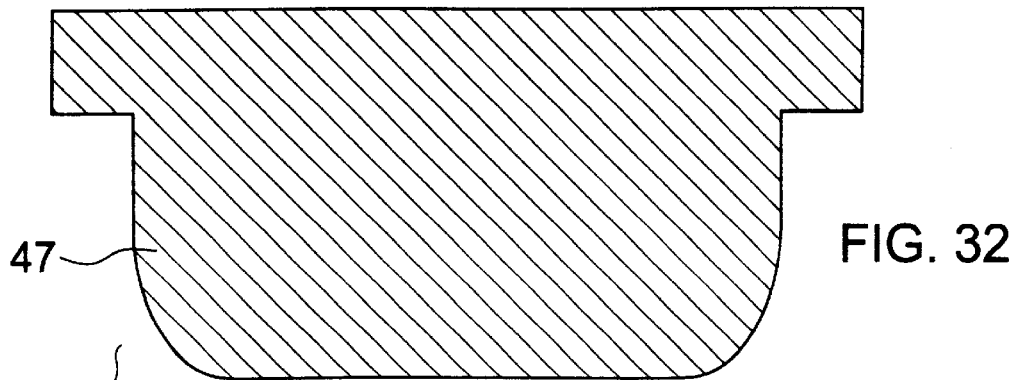
FIG. 32, together the respective detail view of FIG. 33, illustrates the result obtains with the method.
Figure 33:
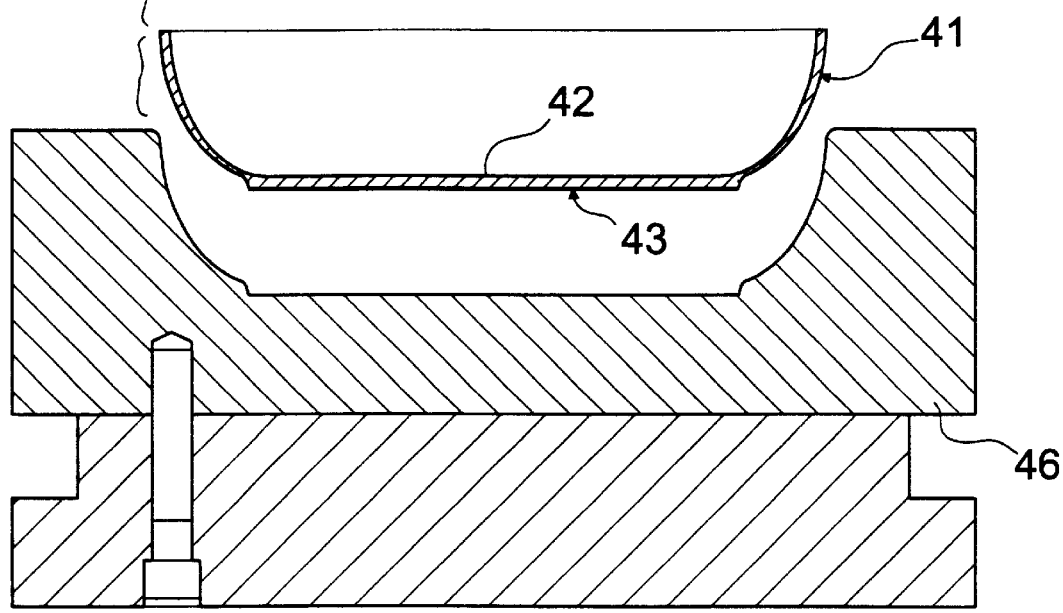
Figure 33:
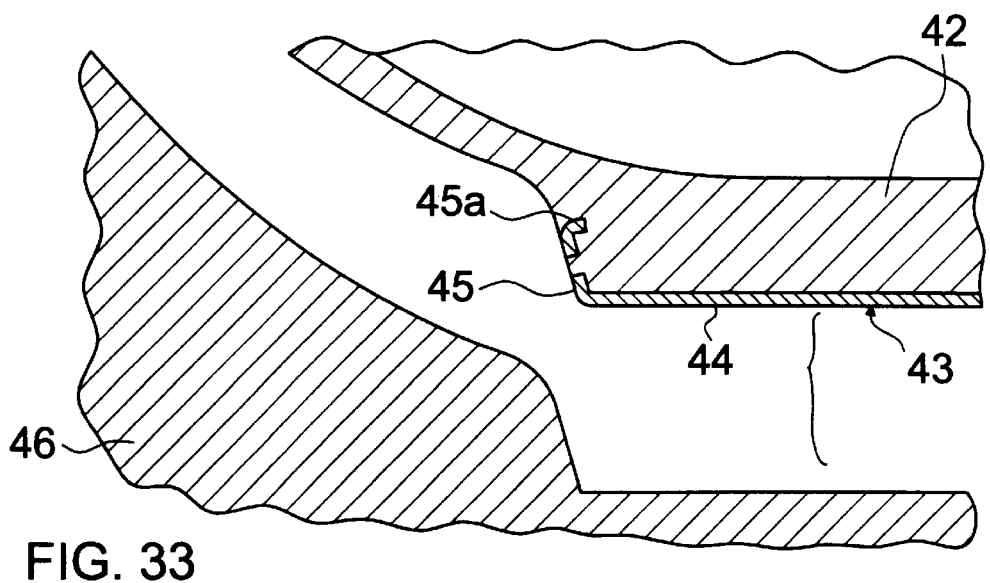

The additional bottom 43 and the container 41 are mutually fixed by means of a cold coining die which comprises a monolithic female part 46 which is fixed to the footing of a press and a male part 47 which is fixed to the movable slider of said press: FIGS. 32 and 33 illustrate the result of the coining, which has caused the material of the container 41 to undergo deformation, embedding the tooth 45a and penetrating the holes such as 45b, so as to lock the additional bottom 43.

Figure 34:
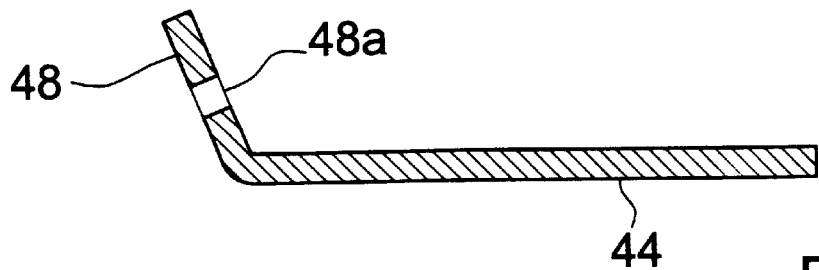
FIGS. 34, 35 and 36 are views of different embodiments of the raised rim.
Figure 35:
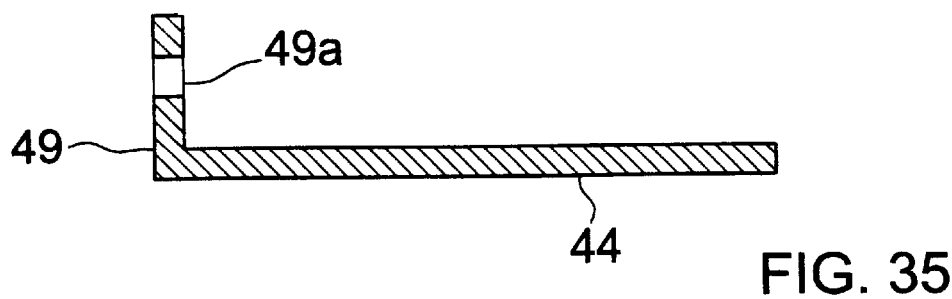
Figure 36:
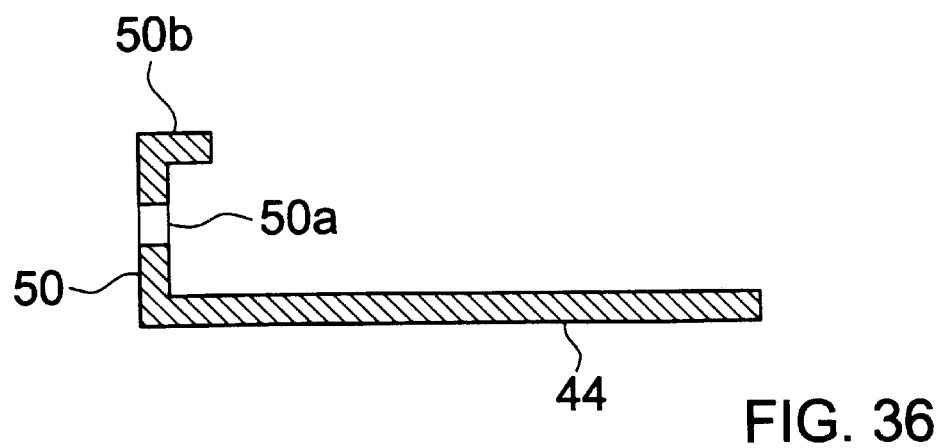
Figure 37:
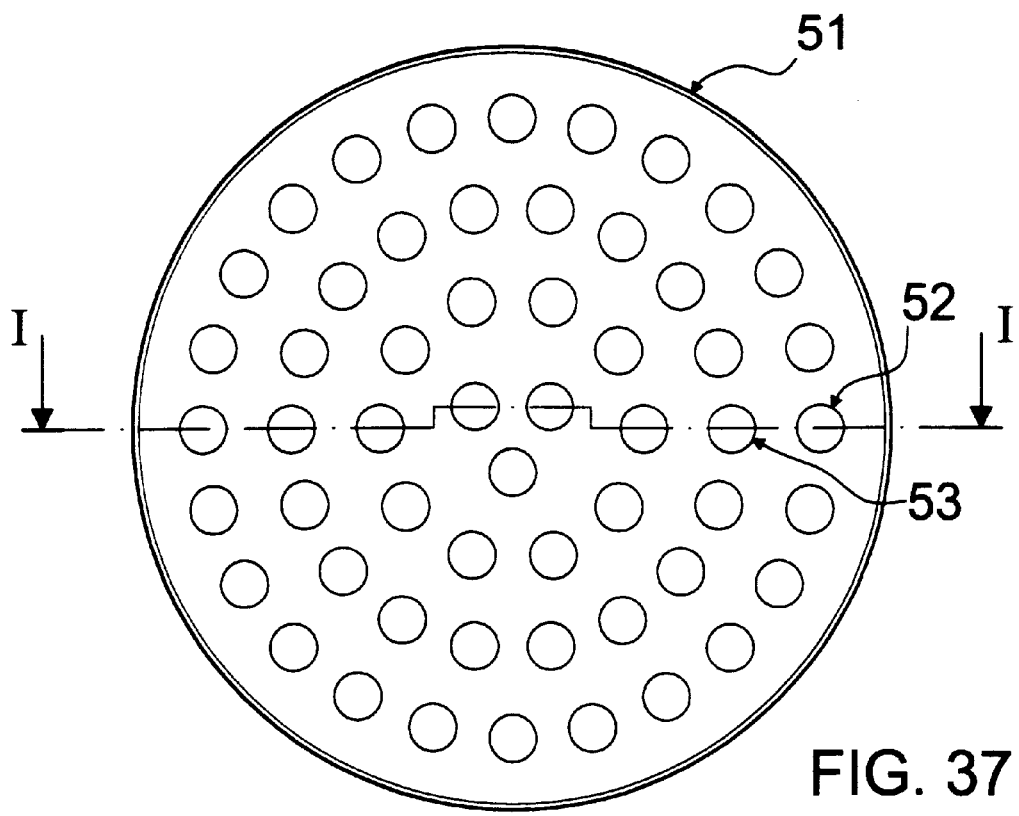
FIG. 37 is a plan view of an additional bottom according to another embodiment.
Figure 38:
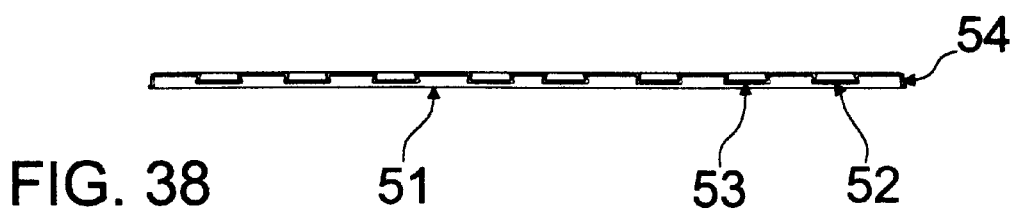
FIG. 38 is a sectional view, taken along the plane I—I of FIG. 37.

FIGS. 34 to 36 illustrate different embodiments of the raised rim located in the peripheral region of the flat plate 44 of the additional bottom which is meant to be fixed to the bottom 42 of an aluminum container.

In the embodiment of FIG. 34, the raised rim 48, provided with holes such as 48a, has a substantially straight continuous cross-section with no end tooth.

In the embodiment of FIG. 35, the raised rim 49, with holes such as 49a, has a substantially straight continuous cross-section which forms with the plate 44 an angle of substantially 90°, like the raised rim 50 with holes such as 50a of the embodiment of FIG. 36, which however has an end tooth 50b.

Other different embodiments are possible: thus, for example, the raised rim of the additional bottom can have a curved cross-section and the end tooth can be shaped in any manner.

The flat plate 44, instead of having the described continuous shape, can be provided with a plurality of holes: in this case, the external surface of the bottom 42 of the container can be flat or provided with projections at said holes.

FIGS. 37 to 42 are views of another embodiment of the invention: in said figures, the reference numeral 51 designates the additional bottom made of steel, which comprises a plurality of studs such as 52 and 53 which have a wider region at the top such as 52a, 53a, which is closed.

Said bottom 51 has, at the rim, a fold 54, which is shaped so as to have a first portion 54a which protrudes from said bottom and an end portion 54b which is substantially parallel to said bottom.

The reference numeral 55 further designates an aluminum container which is shaped like a solid of revolution and is provided, at the bottom 56, with a plurality of cavities such as 57 and 58 which are suitable to receive the studs such as 52 and 53 provided in the additional bottom, and with the circumferential cavity 59 which is suitable to receive the fold 54 of said additional bottom.

The additional bottom 51 and the container 55 are mutually fixed by means of a cold coining die which comprises the male part 60 fixed to the footing of the press and the female part 61, with the baseplate 62 supported by elastic means such as the spring 63, fixed to the movable slider of said press.

It should be noted first of all that the surface of the baseplate 62 that is meant to make contact with the additional bottom 51 has a plurality of protrusions at the studs provided in said bottom 51; said protrusions are suitable to enter said studs, such as 64 and 65 for the studs 52 and 53.

Figure 41:
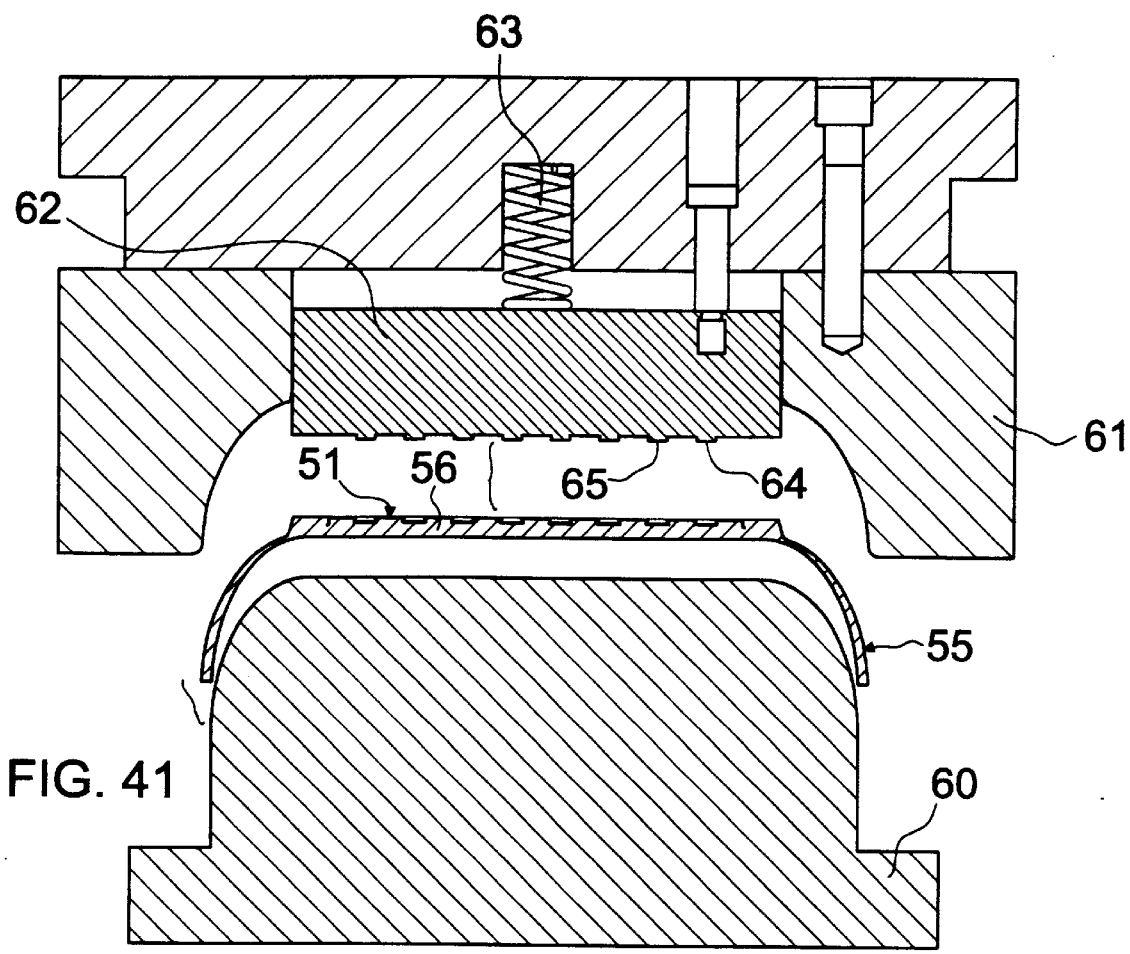
FIG. 41, together with the respective detail view of FIG. 42, illustrates the result obtained.
Figure 42:
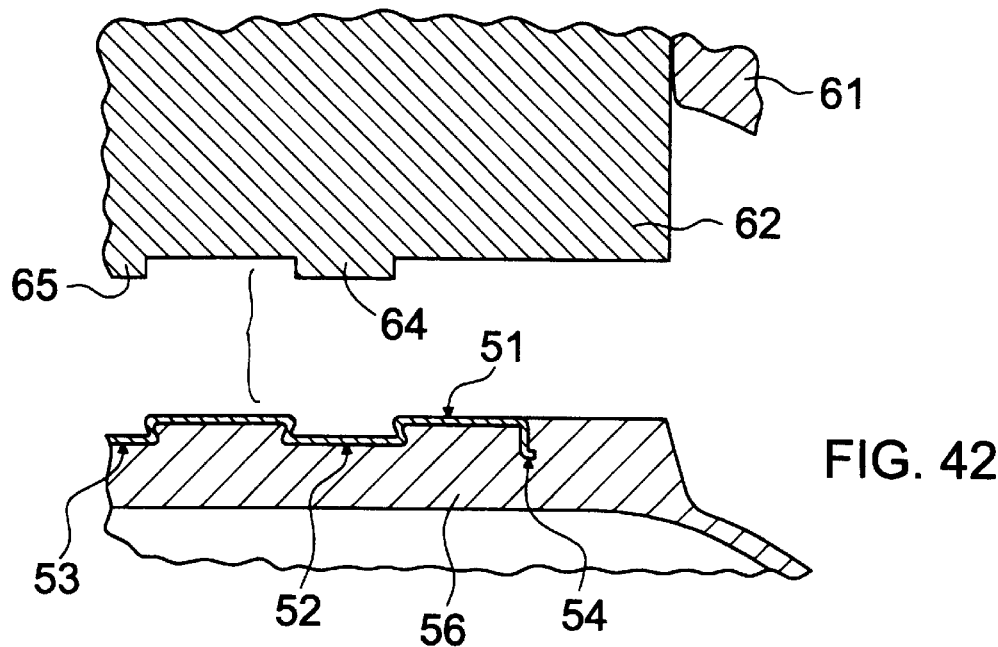
Figure 44:
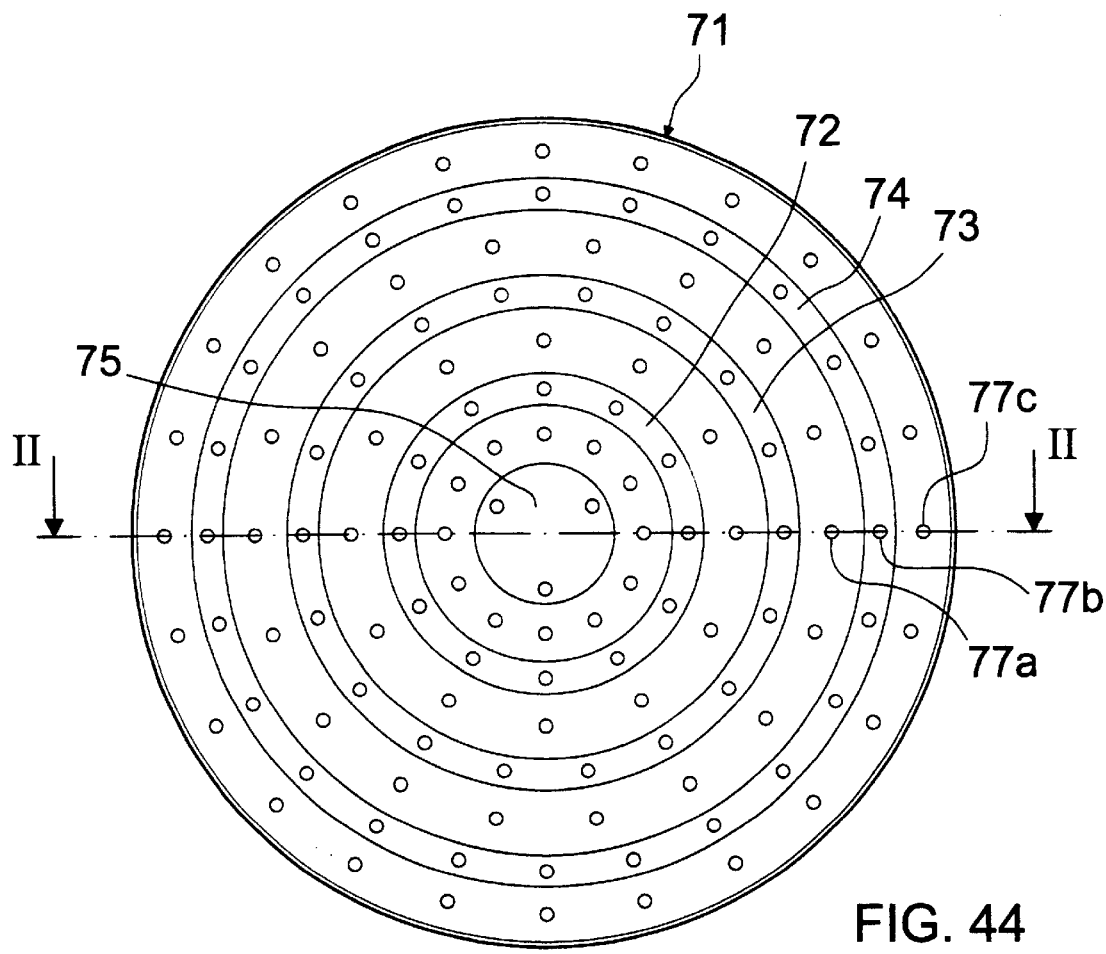
FIG. 44 is a view of an additional bottom according to another embodiment.
Figure 45:
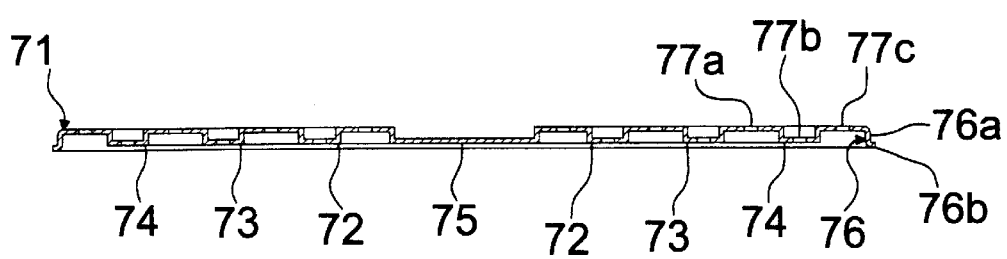
FIG. 45 is a sectional view, taken along the plane II—II of FIG. 44.
Figure 46:
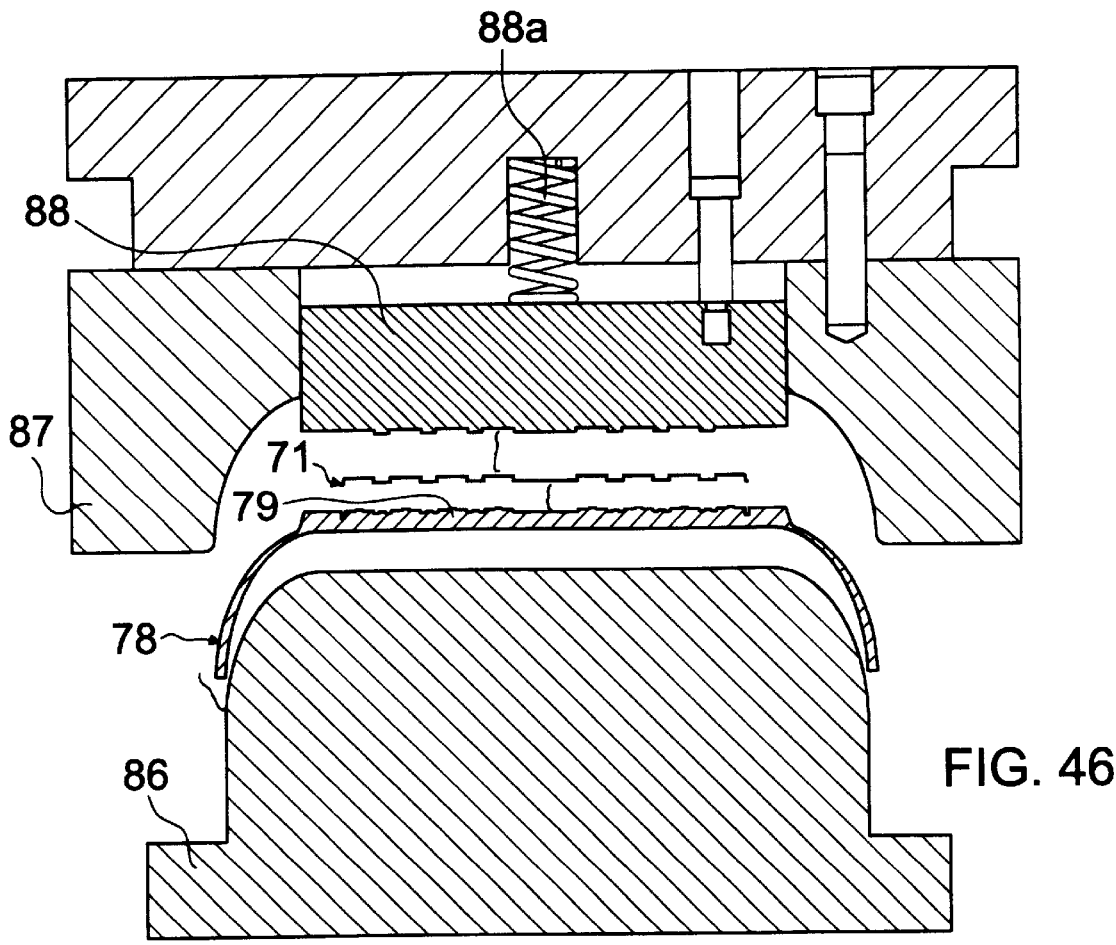
FIG. 46, together with the respective detail view of FIG. 47, illustrates the elements for performing the method by adopting the additional bottom of FIGS. 44 and 45.
Figure 47:
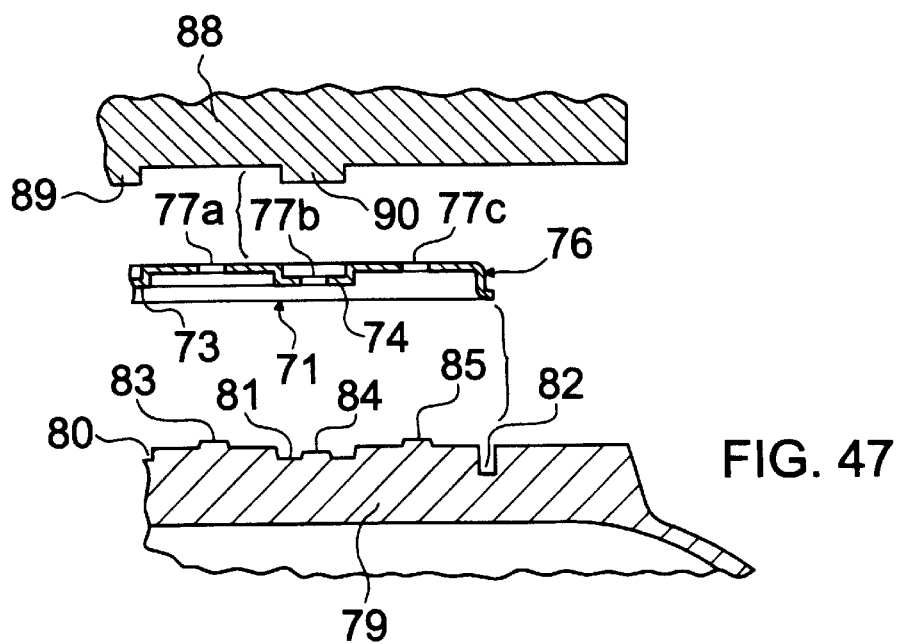

The result shown in FIGS. 41 and 42 with the die open is thus obtained: the additional bottom 51 made of steel adheres to the external surface of the bottom 56 of the container 55, being locked with respect to it by virtue of the embedding of the studs such as 52 and 53 and of the fold 54 within the material of the container.

Figure 43:
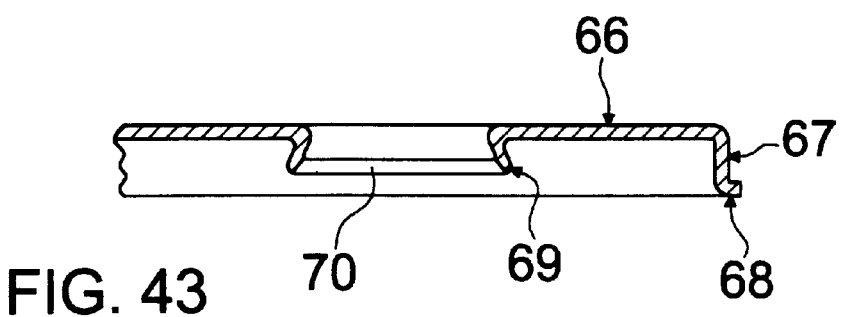
FIG. 43 is a detail view of a different embodiment of the additional bottom with respect to FIG. 38.
Figure 39:
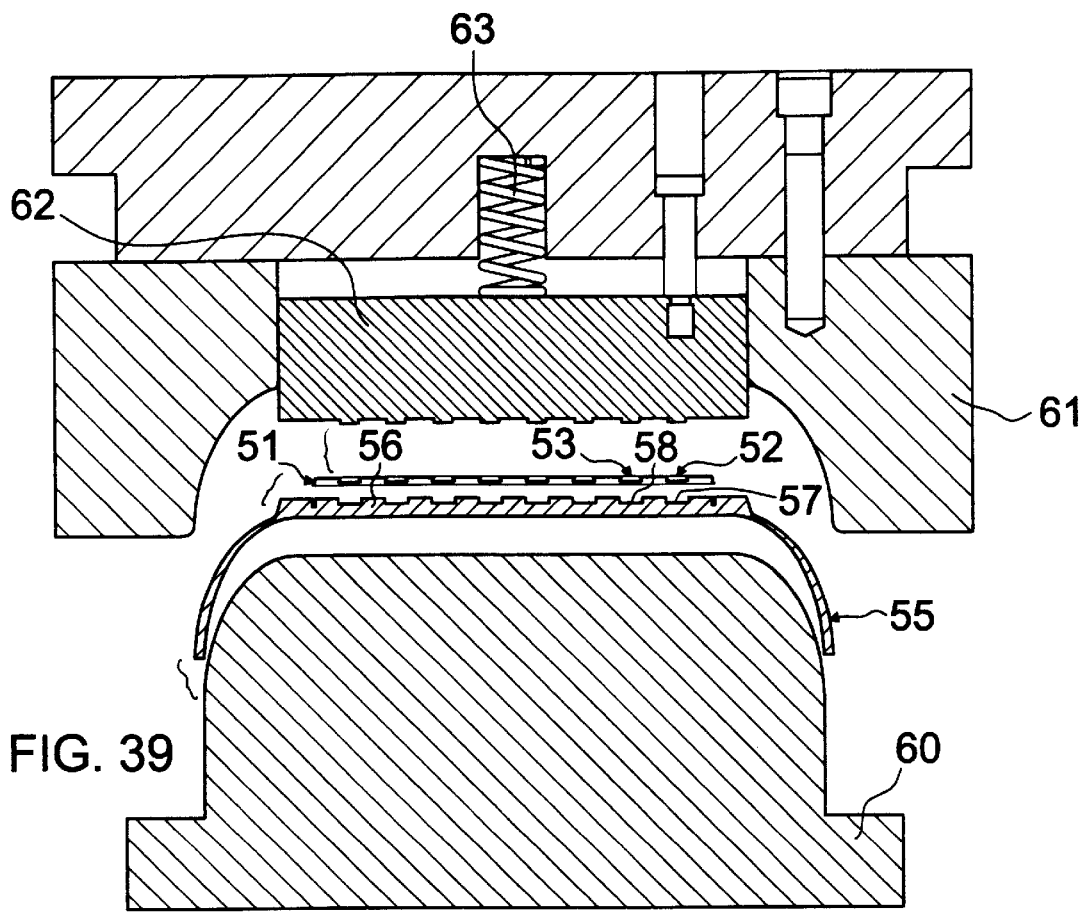
FIG. 39, together with the respective detail view of FIG. 40, illustrates the elements for performing the method by adopting the additional bottom of FIGS. 37 and 38.
Figure 40:
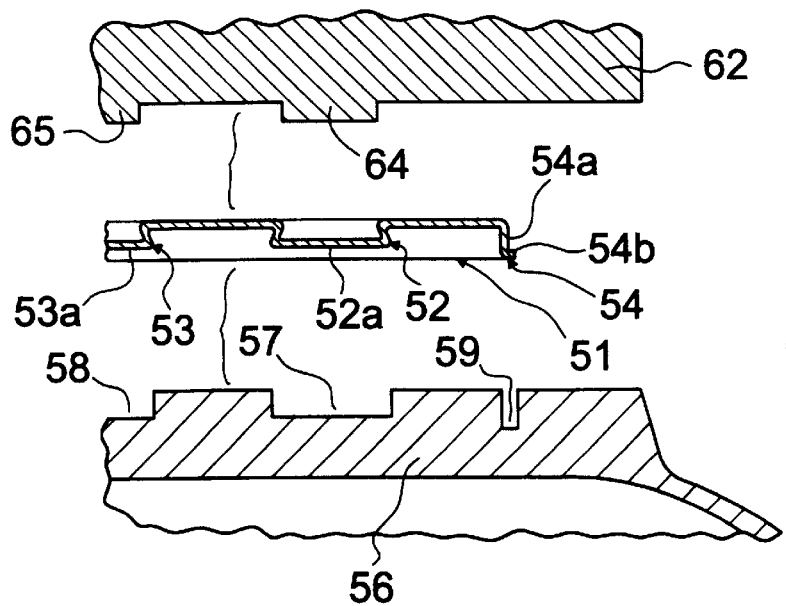

FIG. 43 is a view of a different embodiment of the invention, according to which the additional bottom 66 not only has the fold 67 at the rim with a final portion 68, but also has a plurality of studs 69 which again have a wider region at the top, which is provided with a hole such as 70.

In this situation, during coining the material of the container enters the studs through holes such as 70, effectively cooperating in providing the locking of the additional bottom: the protrusions such as 64 and 65 of the baseplate may be omitted.

Another embodiment of the invention is described with reference to FIGS. 44 to 49 and 54, 57.

In such figures, the reference numeral 71 designates the additional bottom, which comprises a plurality of raised portions shaped like continuous concentric circles 72, 73 and 74 and a central raised portion 75 and is provided, at the rim, with the fold 76, which is shaped so as to form a first portion 76a which protrudes from said bottom and an end portion 76b which is substantially parallel to said bottom.

A plurality of through holes, such as 77a, 77b, 77c, are provided in said additional bottom 71.

The reference numeral 78 further designates an aluminum container which is shaped like a solid of revolution and is provided, at the bottom 79, with a plurality of circumferential slots, such as 80 and 81, which are adapted to receive the raised portions, such as 73 and 74, provided in the additional bottom, and with the circumferential cavity 82, which is suitable to receive the fold 76 of said additional bottom.

The bottom 79 of the container further comprises a plurality of tabs, such as 83, 84 and 85, which are suitable to mate with the holes, such as 77a, 77b and 77c, provided respectively in the additional bottom 71.

The additional bottom 71 and the container 78 are mutually fixed by means of a cold coining die which comprises the male part 86, which is fixed to the footing of the press, and the female part 87, with a baseplate 88 which is supported by elastic means such as the spring 88a which is fixed to the movable slider of said press.

It should be noted first of all that the surface of the baseplate 88 that is meant to make contact with the additional bottom 71 is provided with a plurality of protrusions at the raised portions provided in said bottom 71 which are suitable to enter said raised portions, such as 89 and 90 for the raised portions 73 and 74.

Figure 48:
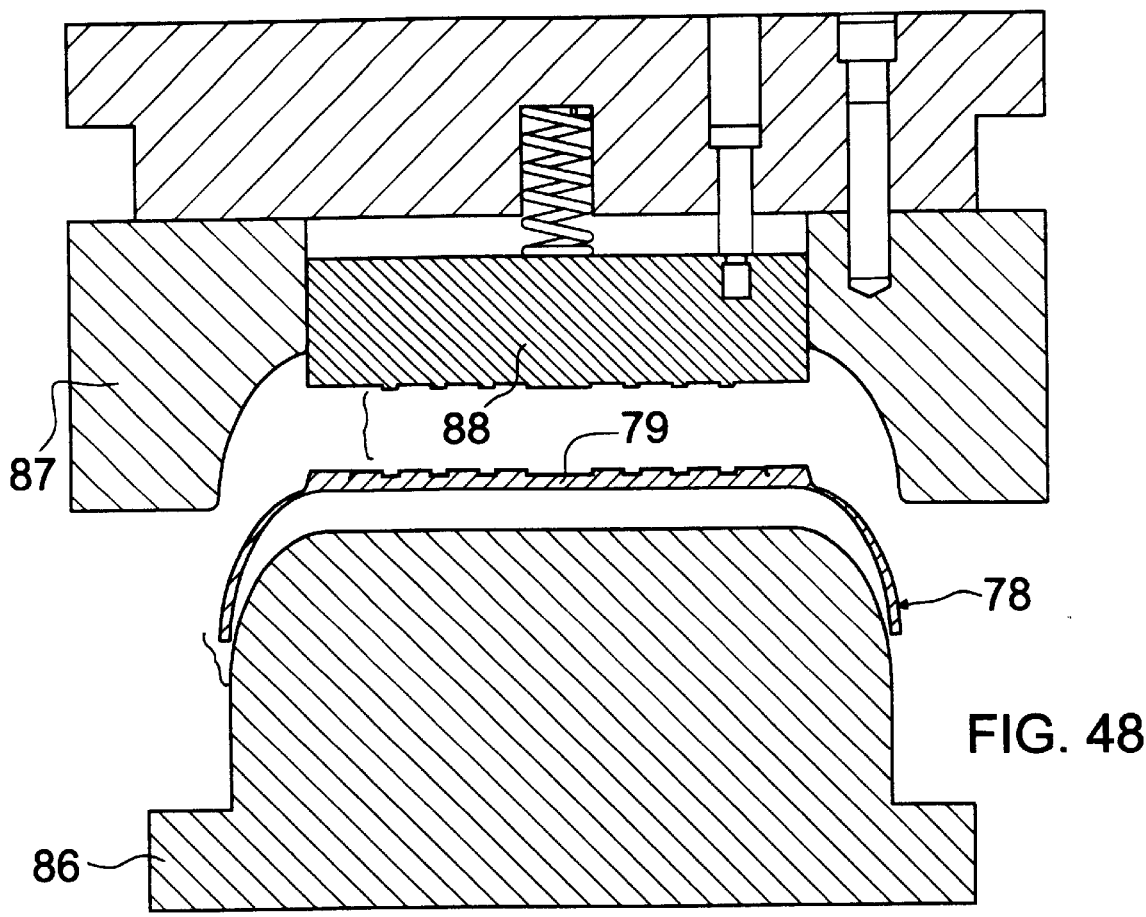
FIG. 48, together with the respective detail view of FIG. 49, illustrates the result obtained.
Figure 49:
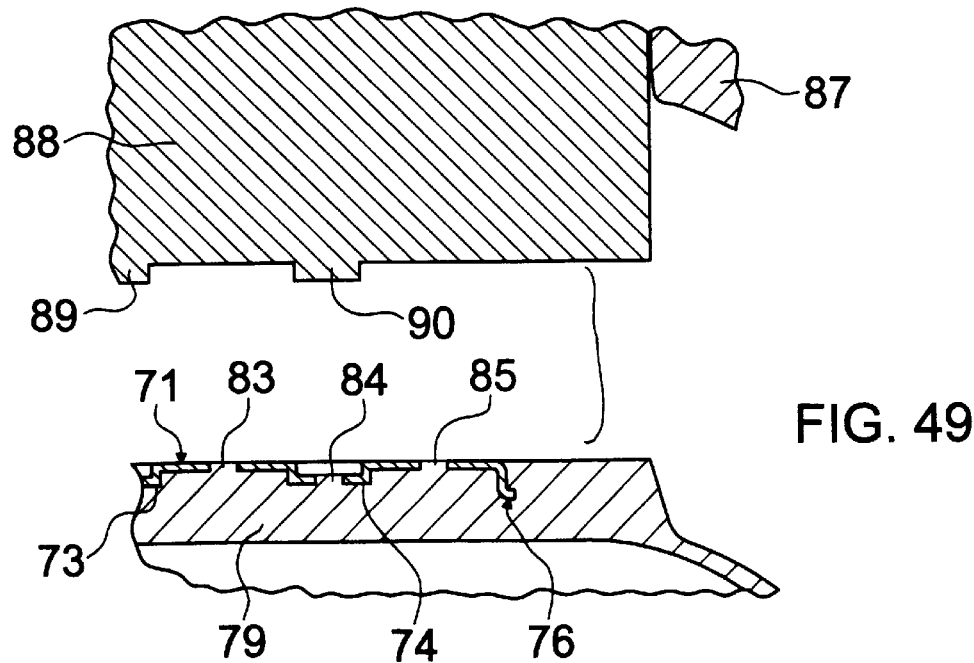

Coining causes the material of the container to undergo deformation, thus achieving the result, shown in FIGS. 48 and 49 with the die open, that the additional steel bottom 71 adheres to the external surface of the bottom 79 of the container 78, being locked with respect to it by virtue of the embedding of the raised portions 72, 73, 74 and 75 and of the fold 76 in the material of said container, and by virtue of the penetration of said material in the holes such as 77a, 77b and 77c provided in said additional bottom.

Figure 50:
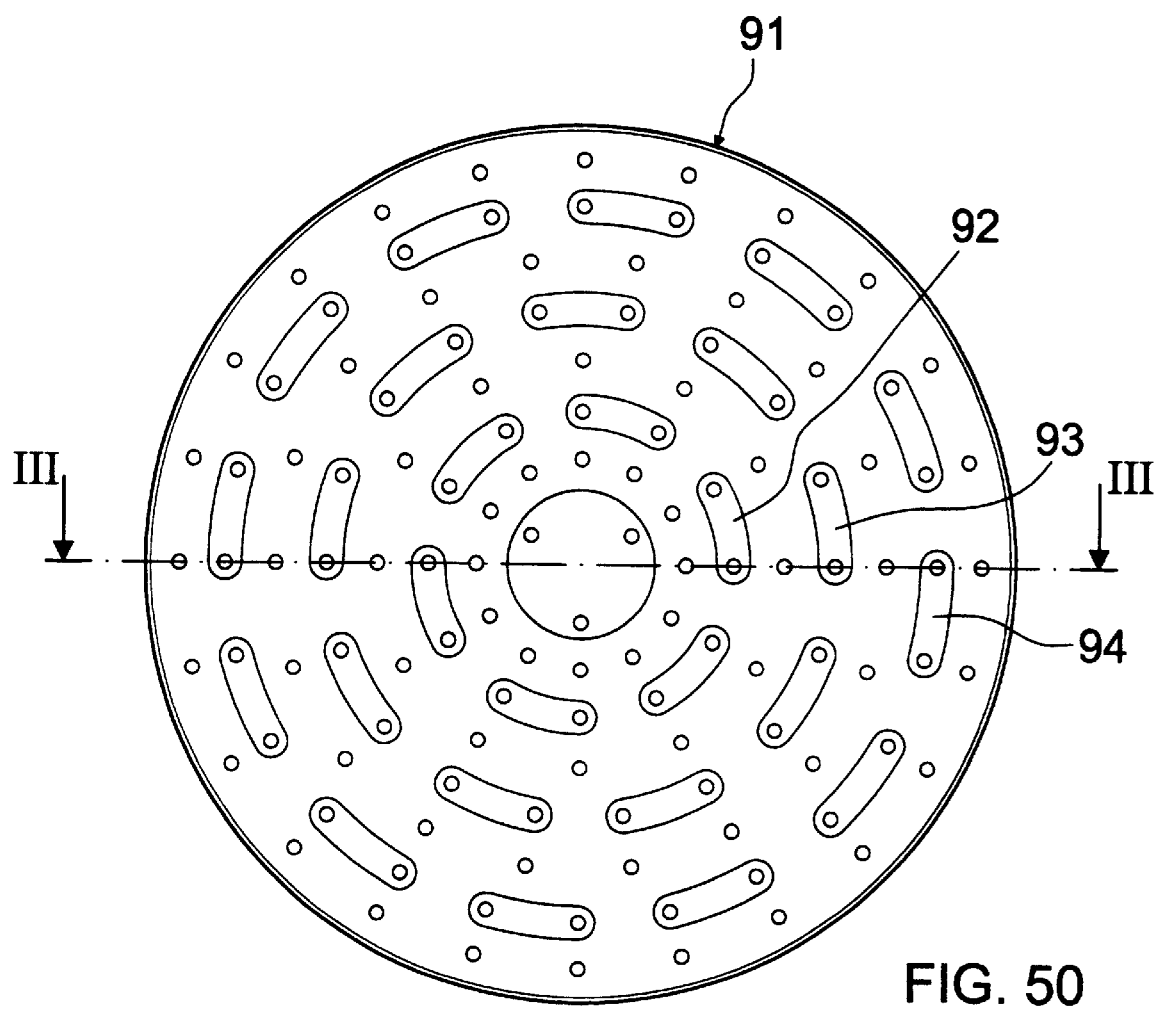
FIGS. 50 and 52 are plan views of additional bottoms according to other different embodiments.
Figure 51:
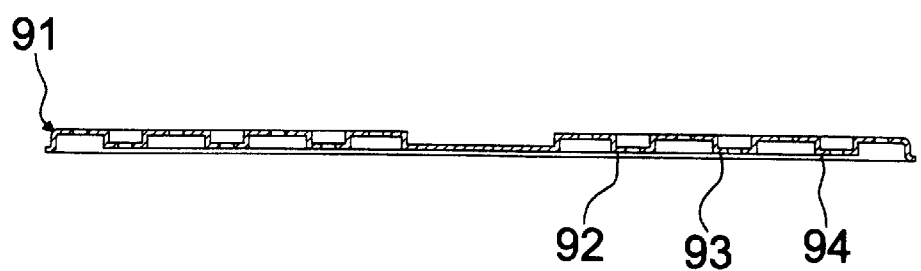
FIGS. 51 and 53 are sectional views, taken along the plane III—III of FIG. 50 along the plane IV—IV of FIG. 52, respectively.
Figure 52:
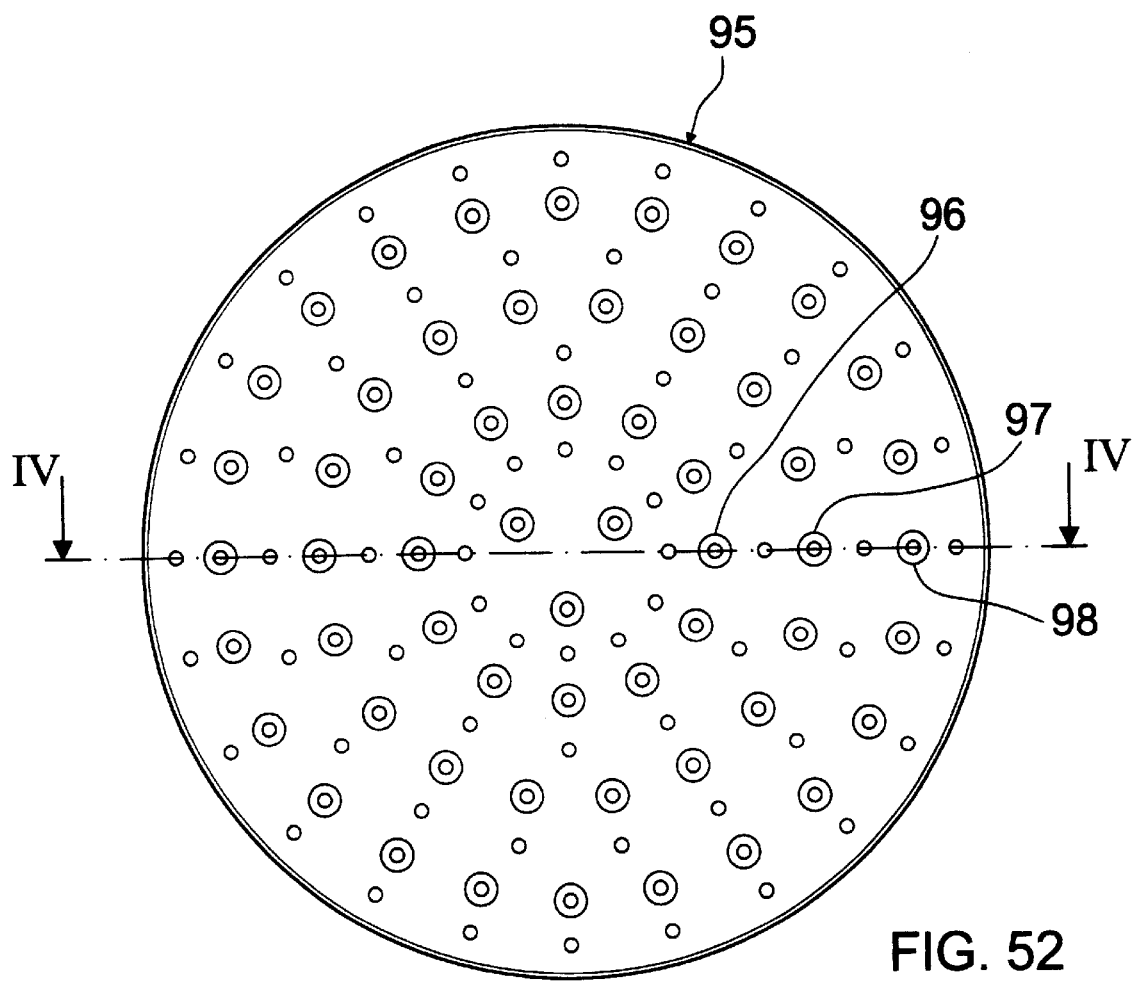
Figure 53:
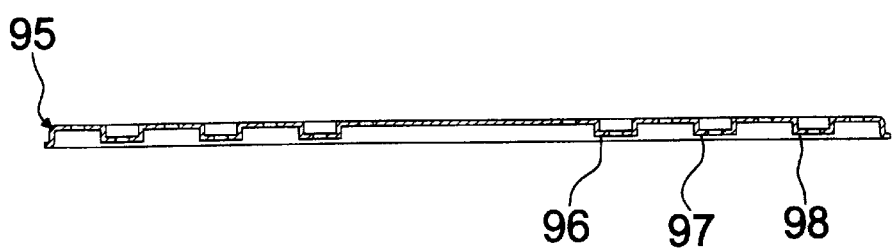

FIGS. 50 and 51 illustrate a different embodiment of the invention, in which the raised portions provided on the additional bottom, designated by the reference numeral 91, are shaped like segmented concentric circles such as 92, 93 and 94, while in the embodiment of FIGS. 52 and 53 the raised portions of the additional bottom 95 are shaped like studs such as 96, 97 and 98.

Figure 54:
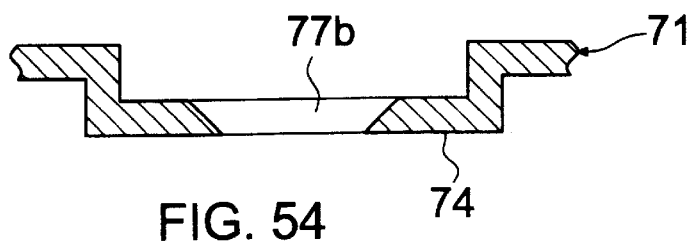
FIG. 54 is an enlarged-scale detail view of a raised portion shown in FIG. 47.
Figure 55:
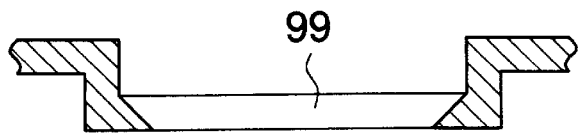
FIGS. 55 and 56 are detail views of the raised portion according to different embodiments.

In all the embodiments described with reference to FIGS. 44 to 53, the holes provided at the raised portions of the additional bottoms have a diameter which is smaller than the width of the head of said raised portions, as shown in FIG. 54, but it is possible to provide said holes as shown in FIG. 55, with a diameter which is substantially equal to said width, as occurs for the hole 99.

Figure 56:
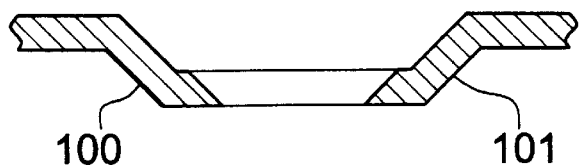
Figure 57:
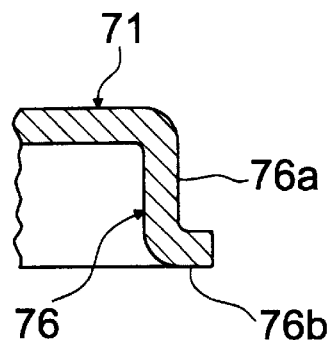
FIG. 57 is an enlarged scale detail view of the fold of the rim shown in FIG. 47.

The walls of the raised portions considered so far, as clearly shown in FIGS. 54 and 55, are perpendicular to the surface of the bottom, but they can also be inclined like the walls 100 and 101 of FIG. 56.

Figure 58:
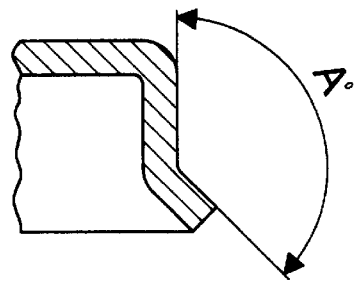
FIGS. 58 and 59 are detail views of the rim according to different embodiments.
Figure 59:
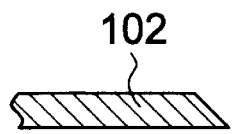
Figure 60:
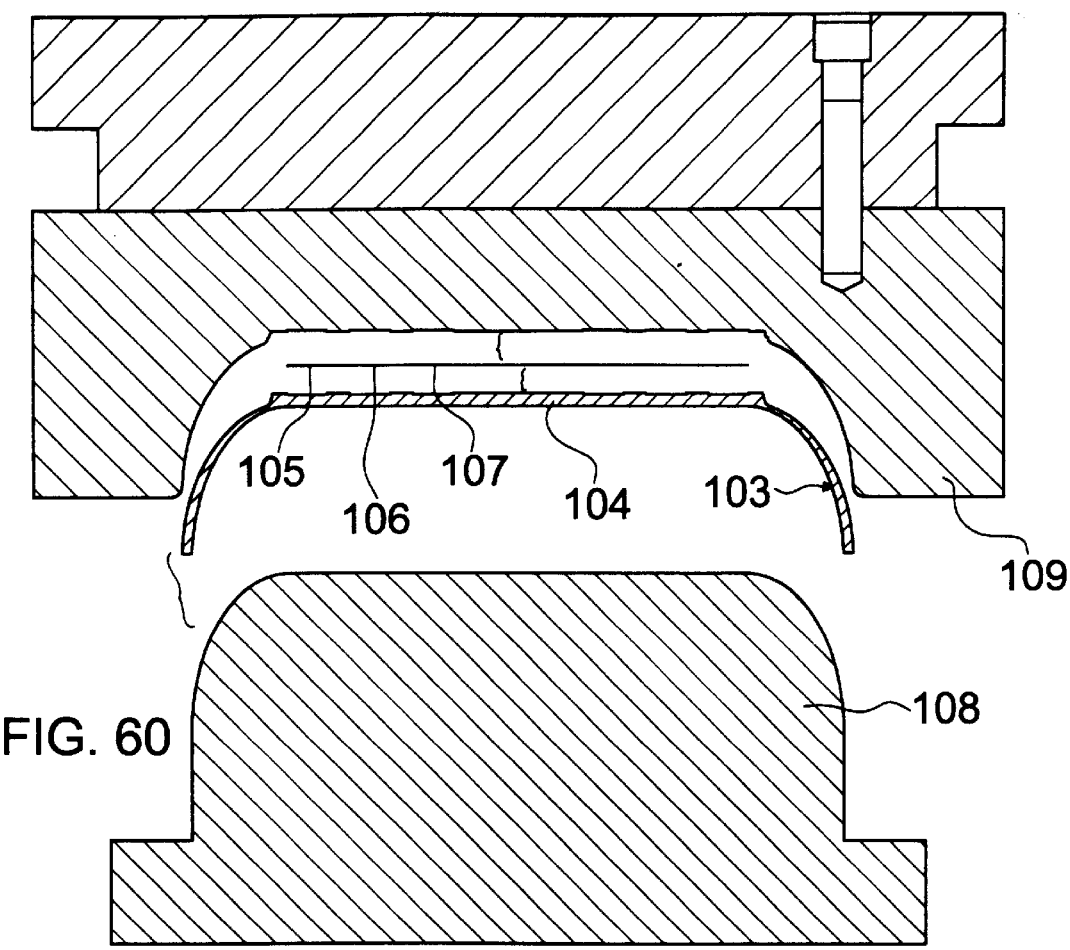
FIG. 60, together with the respective detail view of FIG. 61, illustrates the elements for performing the method according to another embodiment.
Figure 61:
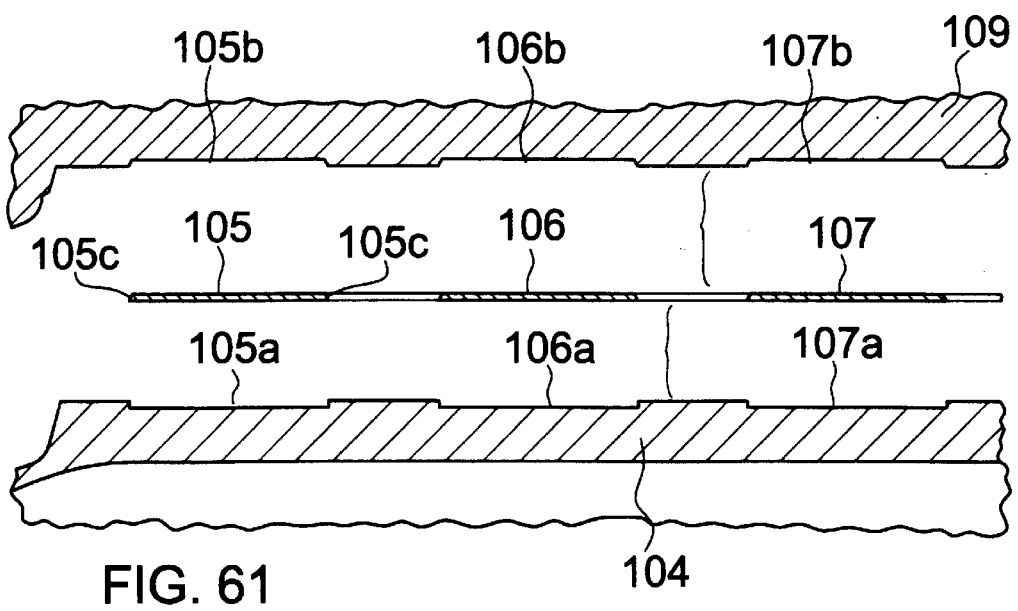
Figure 62:
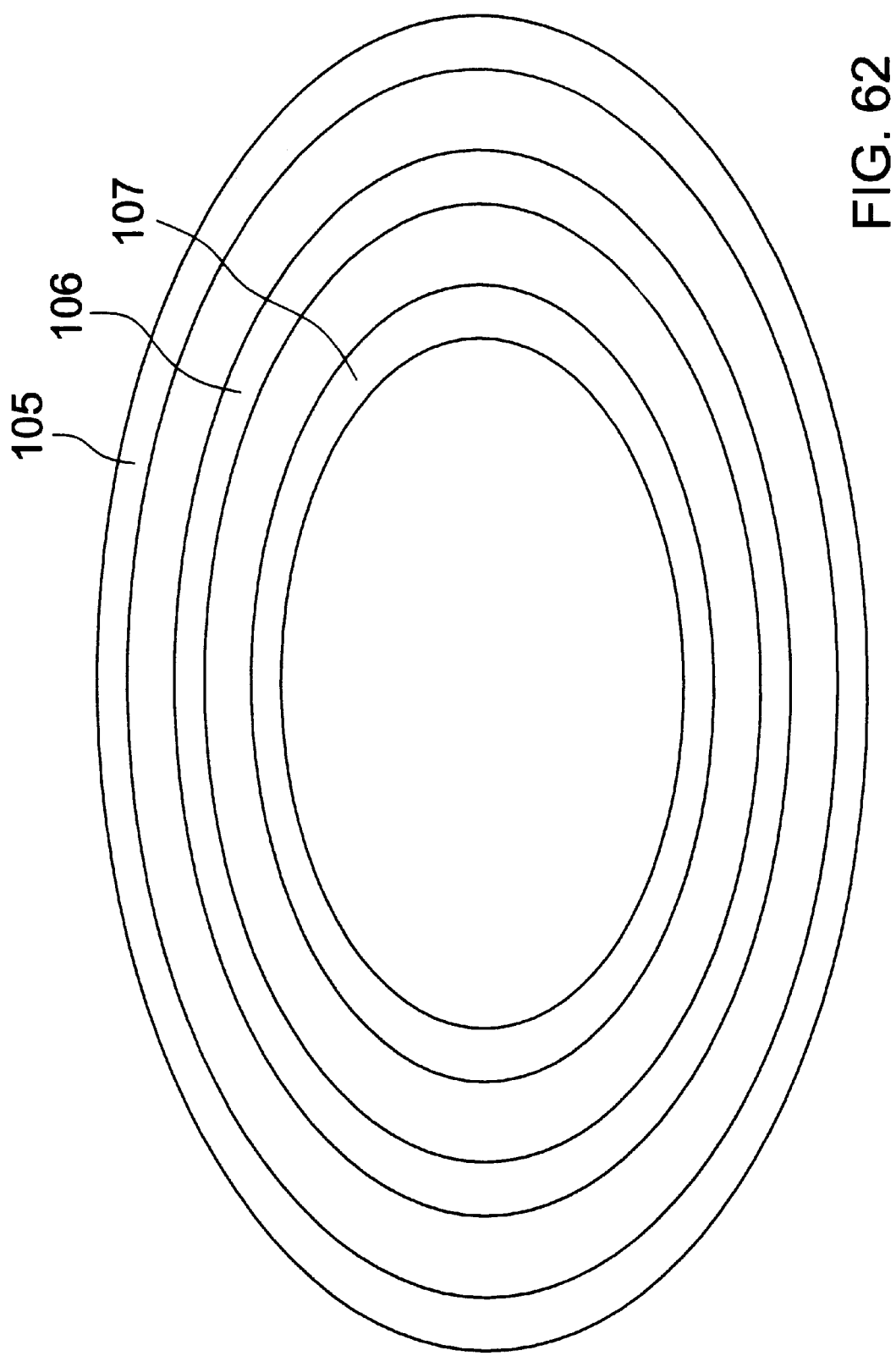
FIG. 62 is a view of the rings meant to form the additional bottom in the embodiment shown in FIGS. 60 and 61.

It is also noted that the fold of the additional bottom can have a variously inclined end portion and that the angle designated by A in FIG. 58 can assume various values, for example between 60° and 300°; said fold may also be omitted, as in the case of the additional bottom 102 of FIG. 59.

As regards the holes formed in the additional bottom, it is noted that they can be provided both within the raised portions and outside them, as in the case of the situations being considered, but they can also be provided only at the raised portions or only outside them; a larger hole might be provided at the central region.

Again with reference to said holes, it should be noted that instead of having the flared shape shown in the figures, they may have a cylindrical wall.

A further embodiment of the invention is shown with reference to FIGS. 60 to 64.

With reference to such figures, the reference numeral 103 designates an aluminum container which is shaped like a solid of revolution with a bottom 104, and the reference numerals 105, 106 and 107 designate three concentric steel rings which are meant to form the additional bottom and are meant to be rested, at the beginning of the method, in the circumferential seats 105a, 106a, 107a formed at the external surface of the bottom 104 of the container 103; in this situation, said rings protrude from the external surface of the bottom 104.

The additional bottom formed by the rings 105, 106, 107 and the container 103 are mutually fixed by means of a cold coining die which comprises a male part 108, which is fixed to the footing of a press, and a female part 109, which is fixed to the movable slider of said press and is provided with circumferential recesses 105b, 106b and 107b which are meant to make contact with said rings.

It is also noted that the rings 105, 106, 107 have a rim, such as 105c for the ring 105, which is inclined inward starting from the surface that is meant to rest in the seat 105a; it should also be noted that said rings can all have the same thickness or can have different thicknesses according to requirements.

Figure 63:
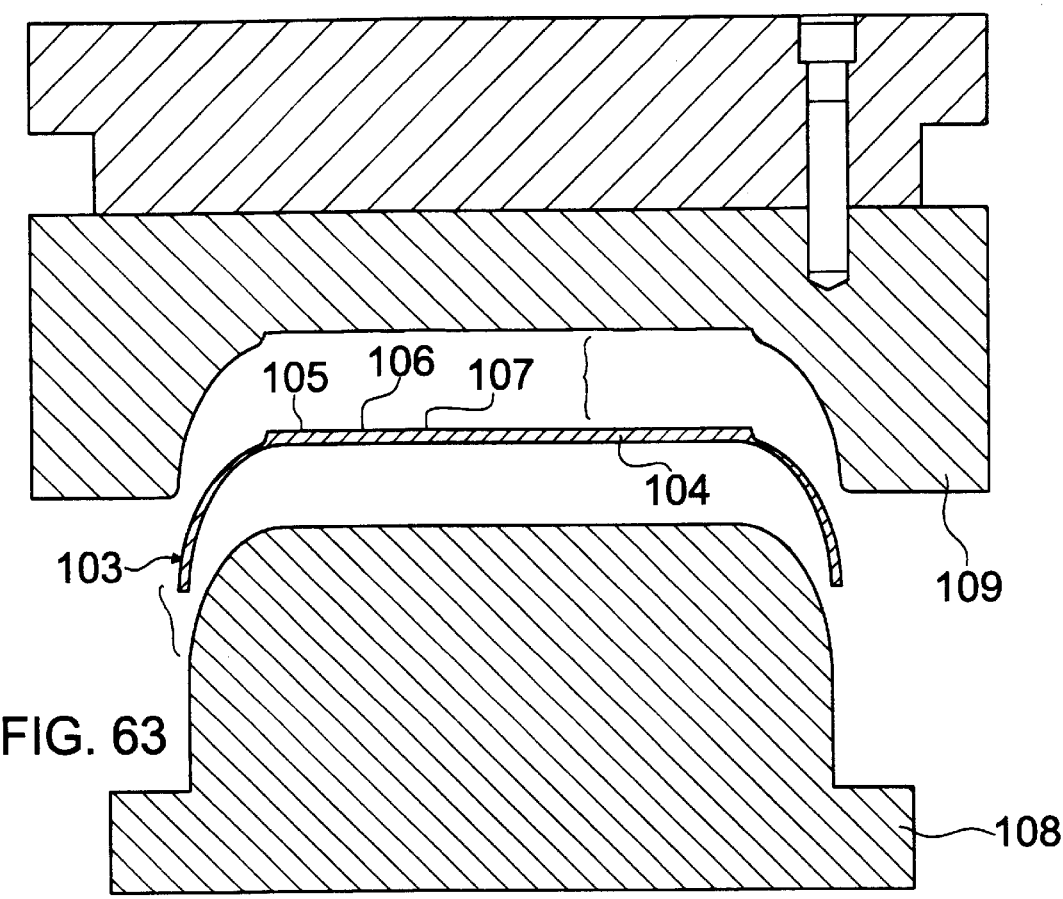
FIG. 63, together with the respective detail view of FIG. 64, illustrates the result obtained.
Figure 64:
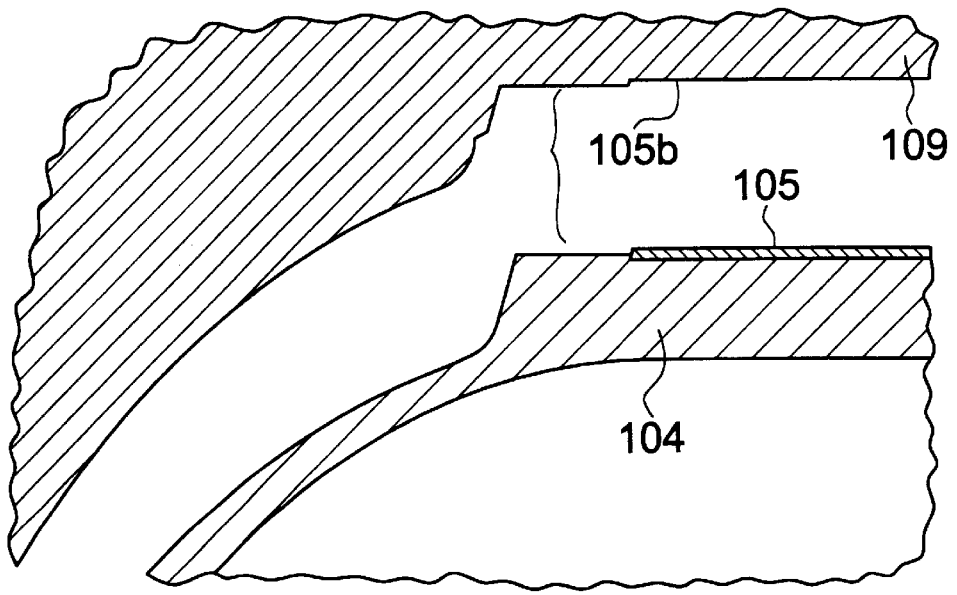

The result shown in FIGS. 63 and 64 with the die open is achieved: the rings 105, 106 and 107 are locked on the bottom 104 of the container by virtue of the overlap of the material of said bottom on part of the inclined edge of said rings.

Some different embodiments of the bottom comprising rings are described with reference to FIGS. 65 to 69.

Figure 65:
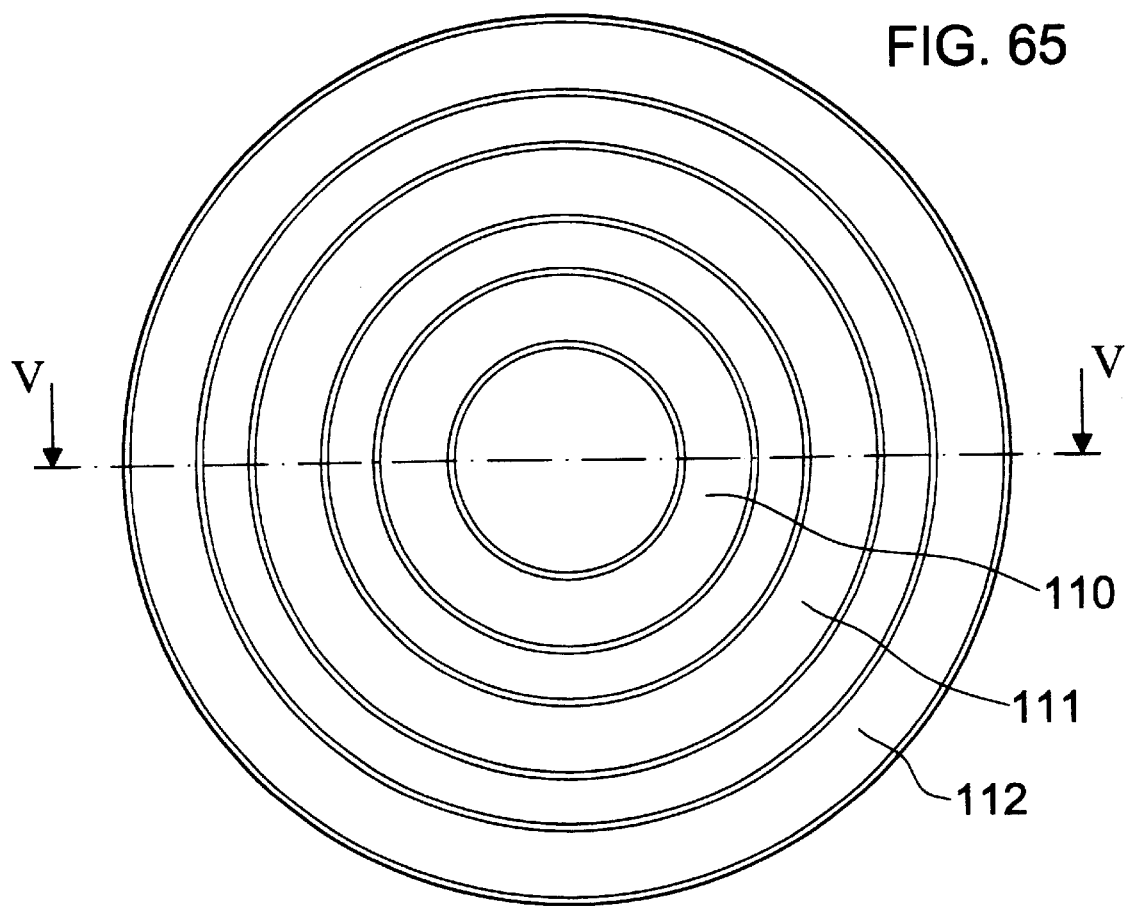
FIG. 65 is a plan view of an additional bottom again provided by means of rings according to a different embodiment.
Figure 66:
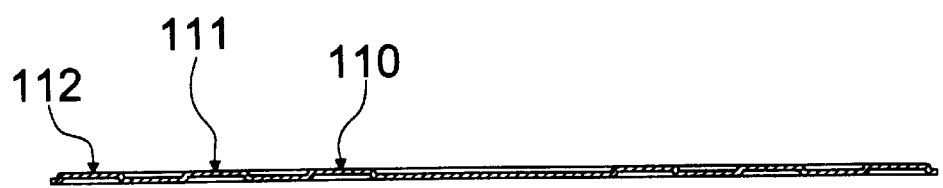
FIG. 66 is a sectional view, taken along the plane V—V of FIG. 65.
Figure 67:
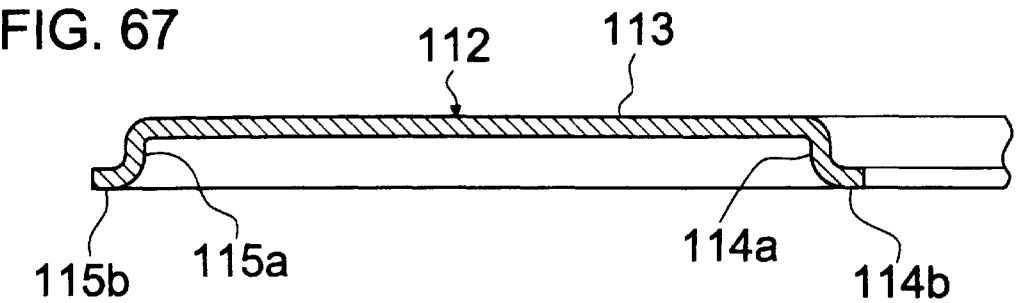
FIG. 67 is a view of a detail of FIG. 66.

FIGS. 65, 66 and 67 illustrate a further embodiment which comprises the three rings 110, 111 and 112, which are meant to form an additional bottom and have identical cross-sections; said cross-section is accordingly described with reference only to the ring 112, which is shown in the detail of FIG. 67.

Said ring thus has, at both edges, a fold which comprises a first portion which extends from the surface 113 of the ring, designated by the reference numerals 114a for the inner edge and 115a for the outer edge, and said first portion ends with a second portion, which is substantially parallel to the surface 113 and is designated by the reference numerals 114b for the inner edge and 115b for the outer edge, which is meant to rest on the bottom of the container.

It is evident that the overlap of the material of the bottom of the container provided due to coining on the edges of the rings shaped as described, and in particular in the portions 114b, 115b of said edges, is particularly effective in locking said rings on said bottom.

Figure 68:
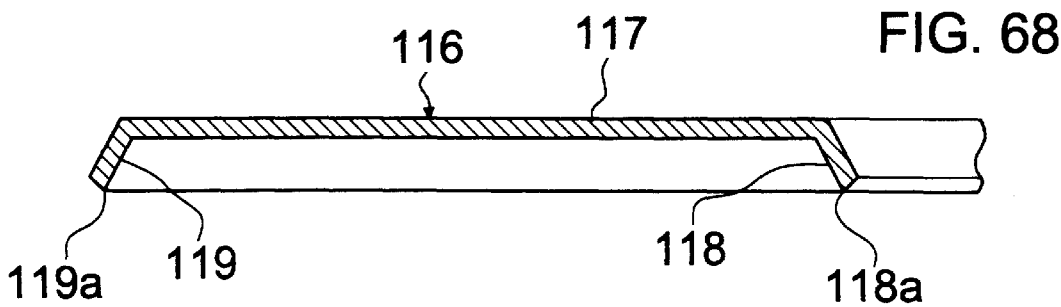
FIGS. 68 and 69 are sectional views of rings according to further embodiments.
Figure 69:
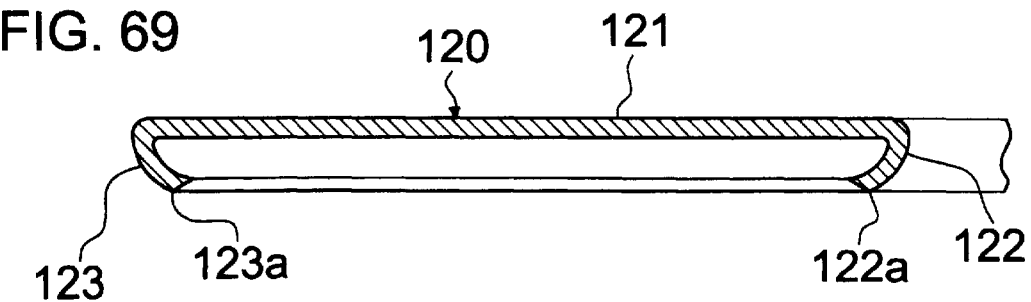

Equally good ring locking conditions are achieved if said rings are shaped according to the embodiments shown in FIGS. 68 and 69.

According to the embodiment of FIG. 68, both the inner edge and the outer edge of the ring 116 have folds with respect to the surface 117 of said ring, designated by the reference numerals 118 and 119 respectively, which are shaped so as to form a single straight portion which is inclined toward the inside of the ring starting from the end, designated by the reference numerals 118a and 119a respectively, that is meant to make contact with the bottom of the container.

According to the embodiment of FIG. 69, both edges of the ring 120 have folds with respect to the surface 121 of said ring, designated by the reference numerals 122 and 123 respectively, which are shaped so as to form a single curved portion which is inclined toward the outside of the ring starting from the end, designated by the reference numerals 122a and 123a respectively, that is meant to make contact with the bottom of the container.

Nothing changes in the described method if the rings meant to form the additional bottom, instead of being mutually independent in order to be arranged concentrically as in the described embodiments, are joined so as to form a spiral, which advantageously ends at the center by widening so as to form a disk.

The described invention is susceptible of numerous other modifications and variations, all of which are within the scope of the inventive concept: the materials may also be any according to requirements.

The disclosures in Italian Patent Applications No. MN98A000014, MN98A000020, MN98A000023, MN98A000024, MN98A000049, MN99A000001, MN99A000016 from which this application claims priority are incorporated herein by reference.

What is claimed is:

1. A method for fixing an additional bottom to an external surface of a bottom of a container, comprising the steps of:
providing said external surface of said bottom of said container as a flat planar portion and an upwardly extending wall portion which extends upwardly from said flat planar portion;
providing a circumferential seat in said upwardly extending wall portion of said external surface of said bottom such that said circumferential seat extends circumferentially about said upwardly extending wall distally from said flat planar portion;

providing said additional bottom as a flat plate and a raised rim extending upwardly from said flat plate, and further as an end tooth which is bent with respect to said raised rim inwardly with respect to said additional bottom and which is flanged distally from said flat plate;

coining said additional bottom and container mutually together in a die having a male part and a female part which are mutually relatively moveable with respect to one another by arranging said additional bottom in said female part and press said bottom of said container in said additional bottom until said end tooth of said additional bottom enters into said circumferential seatin said upwardly extending wall portion of said external surface of said bottom of said container so as to securely attach said additional bottom to said external surface of said bottom of said container.

2. The method according to claim 1, wherein the coining step comprises initially resting said raised rim of said additional bottom against a side wall of the female part.

3. The method according to claim 2, wherein after initially resting said raised rim of said additional bottom against the side wall of the female part the coining step comprises resting said bottom of said container in said additional bottom and relatively moving said male and female parts with respect to one another and deforming said raised rim of the additional bottom by bending said raised rim towards said bottom of said container during contact of said raised rim with the side wall of the female part at a peripheral region of a baseplate of the female part.

4. The method according to claim 3, comprising providing the raised rim of the additional bottom with a substantially straight cross-section which forms, together with said flat plate of the additional bottom, an angle of more than 90°.

5. The method according to claim 3, comprising providing the raised rim of the additional bottom with a substantially straight cross-section which forms, together with said flat plate of the additional bottom, an angle of substantially 90°.

6. The method according to claim 3, comprising providing the raised rim of the additional bottom with a curved cross-section.

7. The method according to claim 3, comprising providing the raised rim of the additional bottom with a continuous cross-section.

8. The method according to claim 3, comprising providing the raised rim of the additional bottom with at least one circumferential protrusion.

9. The method according to claim 3, comprising providing the raised rim of the additional bottom with at least one circumferential protrusion which is directed toward the bottom of the container during the coining step.

10. The method according to claim 3, comprising providing the raised rim of the additional bottom with a plurality of protrusions.

11. The method according to claim 3, comprising providing the raised rim of the additional bottom with a plurality of projections which are directed toward the bottom of the container during the coining step.

12. The method according to claim 3, comprising providing the raised rim of the additional bottom with a plurality of holes.

13. The method according to claim 3, comprising during the bending of said raised rim towards said bottom of said container further bending said end tooth into engagement with said circumferential seat of said bottom of said container.

14. The method according to claim 13, comprising providing said end tooth of said additional bottom with sufficient clearance so as to not interfere with said bottom of said container during insertion of said bottom of said container in said additional bottom.

15. The method according to claim 13, comprising providing said end tooth with at least one straight portion which forms, together with said raised rim, an angle of no more than approximately 90° and no less than approximately 60°.

16. The method according to claim 13, comprising providing said end tooth with exclusively a straight portion with a continuous surface.

17. The method according to claim 13, comprising providing said end tooth with exclusively a straight portion with a surface provided with holes.

18. The method according to claim 13, comprising providing said end tooth with exclusively a straight portion with a surface provided with discontinuities.

19. The method according to claim 13, comprising providing said end tooth with a folded end after a straight portion.

20. The method according to claim 3, comprising providing the flat plate of the additional bottom with a continuous shape.

* * * * *